United States Patent [19]

Kishino et al.

[11] Patent Number: 5,703,611
[45] Date of Patent: Dec. 30, 1997

[54] IMAGE DISPLAY DEVICE AND DRIVE DEVICE THEREFOR

[75] Inventors: Takao Kishino; Tatsuo Yamaura; Koji Onodaka; Shigeo Itoh, all of Mobara, Japan

[73] Assignee: Futaba Denshi Kogyo K.K., Mobara, Japan

[21] Appl. No.: 777,193

[22] Filed: Dec. 27, 1996

Related U.S. Application Data

[63] Continuation of Ser. No. 251,245, May 31, 1994, abandoned.

[30] Foreign Application Priority Data

| May 31, 1993 | [JP] | Japan | 5-149911 |
| May 31, 1993 | [JP] | Japan | 5-149912 |
| May 28, 1993 | [JP] | Japan | 5-028256 |

[51] Int. Cl.[6] .................................................. G09G 3/22
[52] U.S. Cl. ........................... 345/74; 313/496; 345/72
[58] Field of Search ........................ 345/74, 75, 47, 345/55, 72; 313/484, 485, 495, 496, 497, 422

[56] References Cited

U.S. PATENT DOCUMENTS

| 4,114,148 | 9/1978 | Maloney et al. | 313/484 |
| 4,160,191 | 7/1979 | Hausfeld | 345/74 |
| 4,163,971 | 8/1979 | Morin et al. | 313/484 |
| 4,682,239 | 7/1987 | Watanabe | 345/74 |
| 5,015,912 | 5/1991 | Spindt et al. | 345/74 |
| 5,036,317 | 7/1991 | Buzak | 345/74 |
| 5,138,308 | 8/1992 | Clerc et al. | 345/75 |
| 5,142,388 | 8/1992 | Wantanabe et al. | 345/75 |
| 5,202,674 | 4/1993 | Takemori et al. | 345/75 |
| 5,278,544 | 1/1994 | Leroux | 345/74 |
| 5,404,074 | 4/1995 | Watanabe et al. | 345/74 |
| 5,430,459 | 7/1995 | Clerc | 345/74 |

*Primary Examiner*—Dennis-Doon Chow
*Attorney, Agent, or Firm*—Oblon, Spivak, McClelland, Maier & Neustadt, P.C.

[57] ABSTRACT

An image display device including a field emission element capable of preventing diffusion of electrons to be impinged on a display section. An anode substrate is provided thereon with a phosphor-deposited display section and a cathode substrate is provided thereon with field emission elements including cathode conductors, emitter electrodes and gate electrodes. The cathode conductors and gate electrodes are formed into a stripe-like shape and arranged so as to intersect each other to form a matrix. A stripe-like diffusion prevention electrode is arranged between each adjacent two of the gate electrodes. The emitter electrodes selected by the gate electrodes and cathode conductors emit electrons. The diffusion prevention electrodes on both sides of each of the gate electrodes selected are applied thereto a voltage lower than a voltage of the gate electrodes, so that the electrons may be impinged on the display section required without diffusion, to thereby permit picture cells required to emit light.

16 Claims, 24 Drawing Sheets

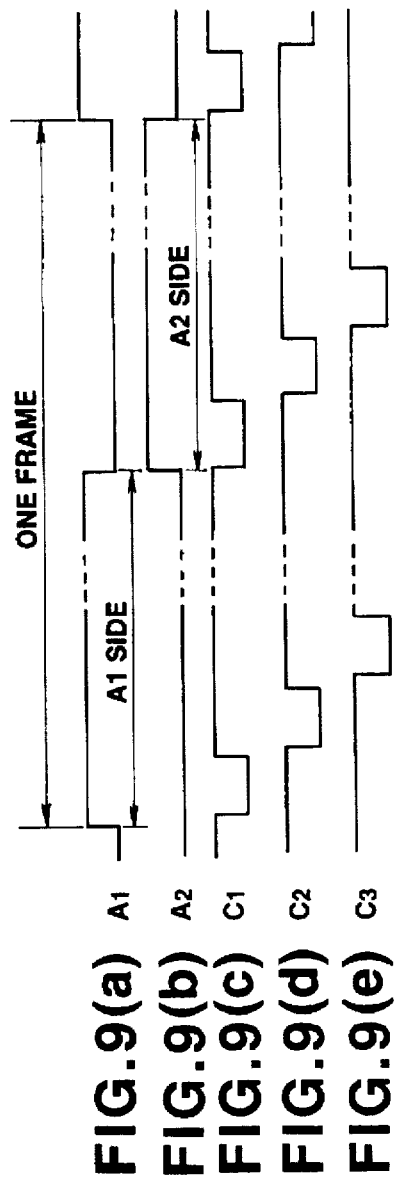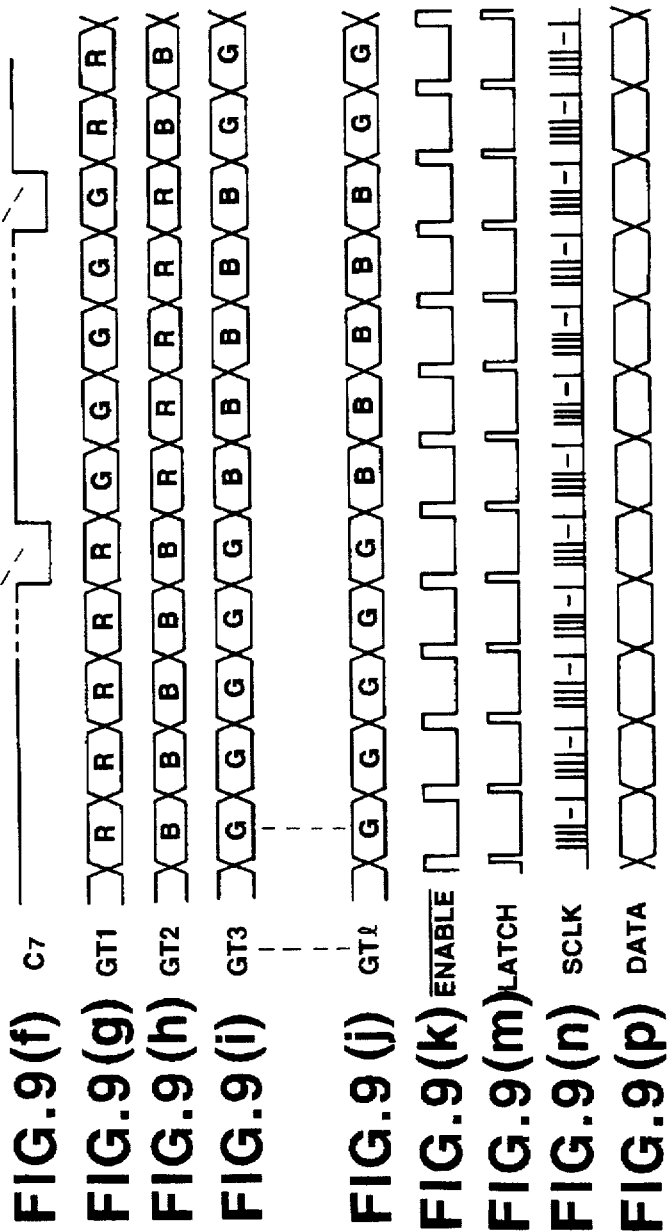

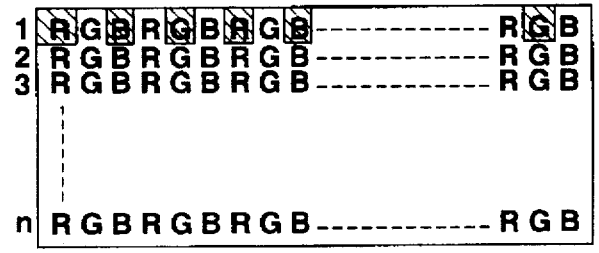
FIG.10(a) ANODE A1 CATHODE C1
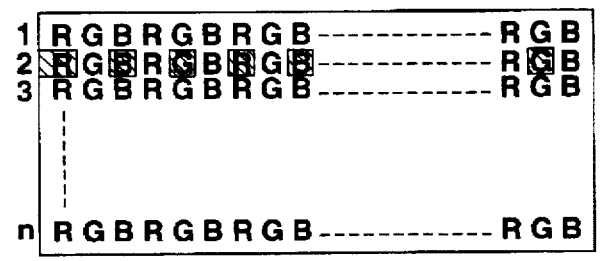
FIG.10(b) ANODE A1 CATHODE C2
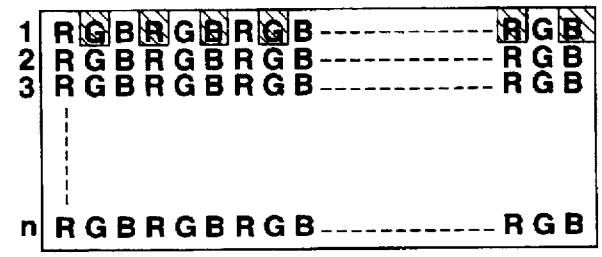
FIG.10(c) ANODE A2 CATHODE C1
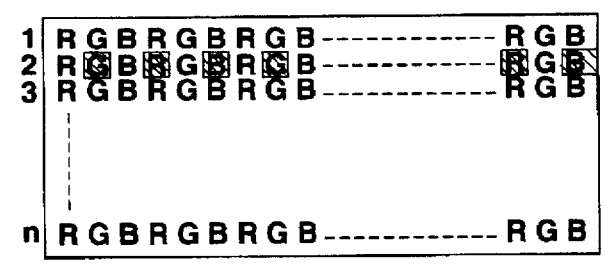
FIG.10(d) ANODE A2 CATHODE C2

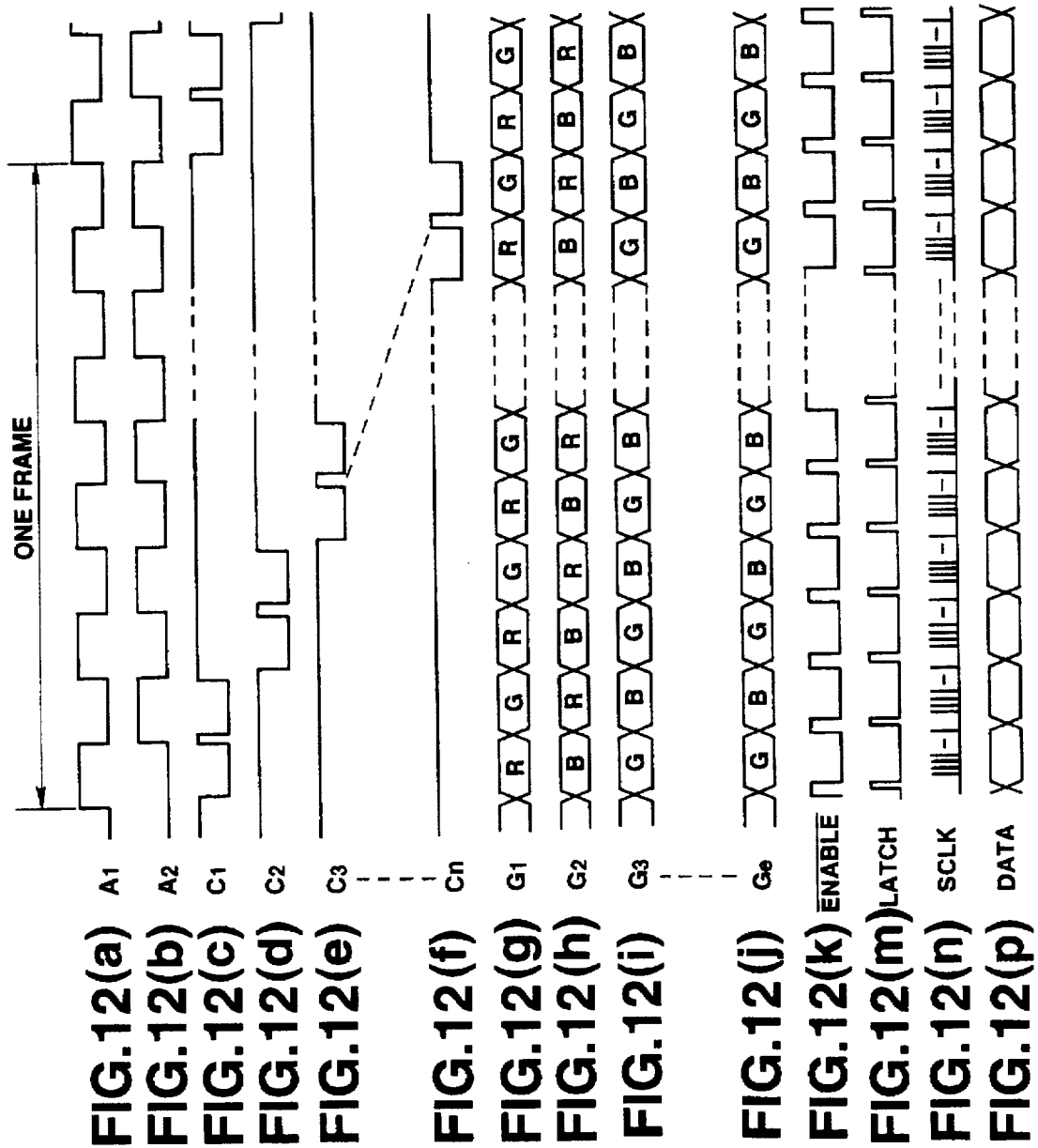

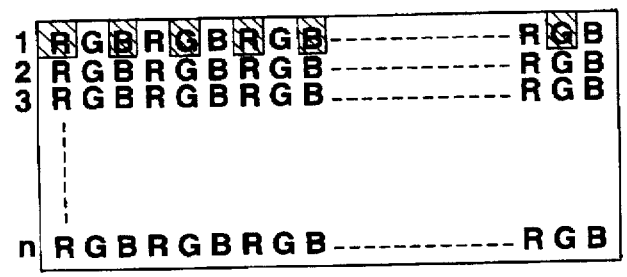
FIG.13(a) ANODE A1
CATHODE C1
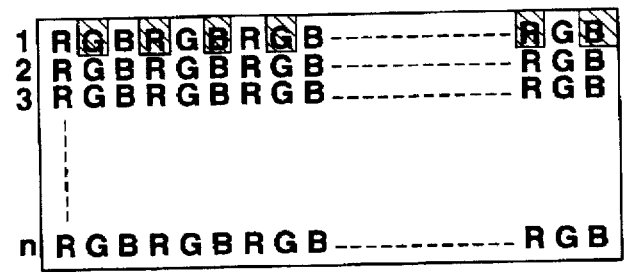
FIG.13(b) ANODE A2
CATHODE C1
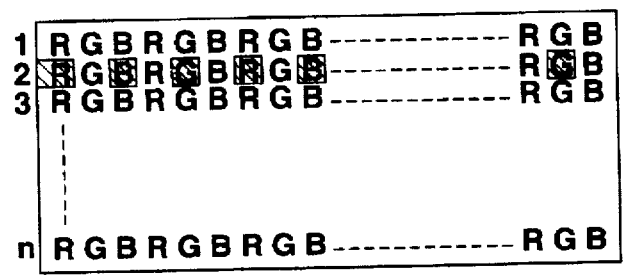
FIG.13(c) ANODE A1
CATHODE C2
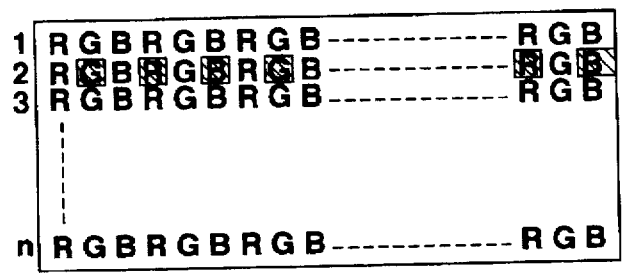
FIG.13(d) ANODE A2
CATHODE C2

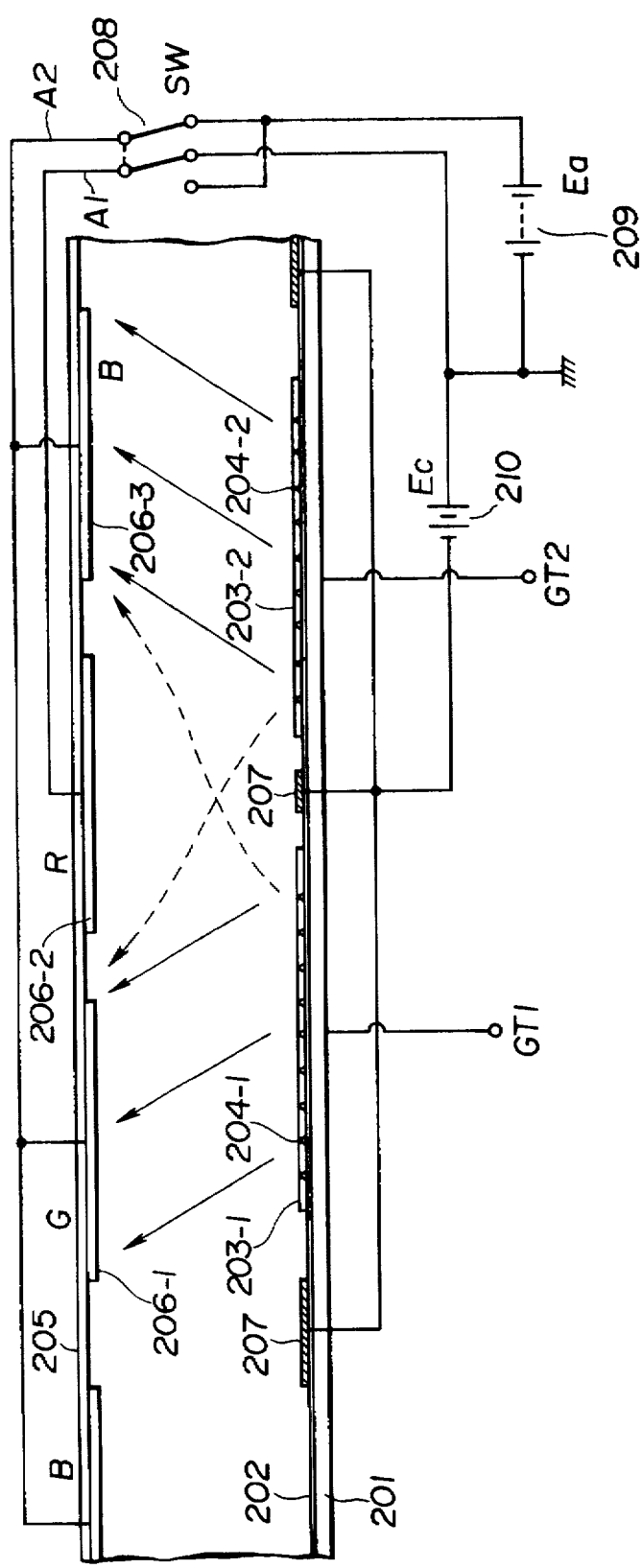

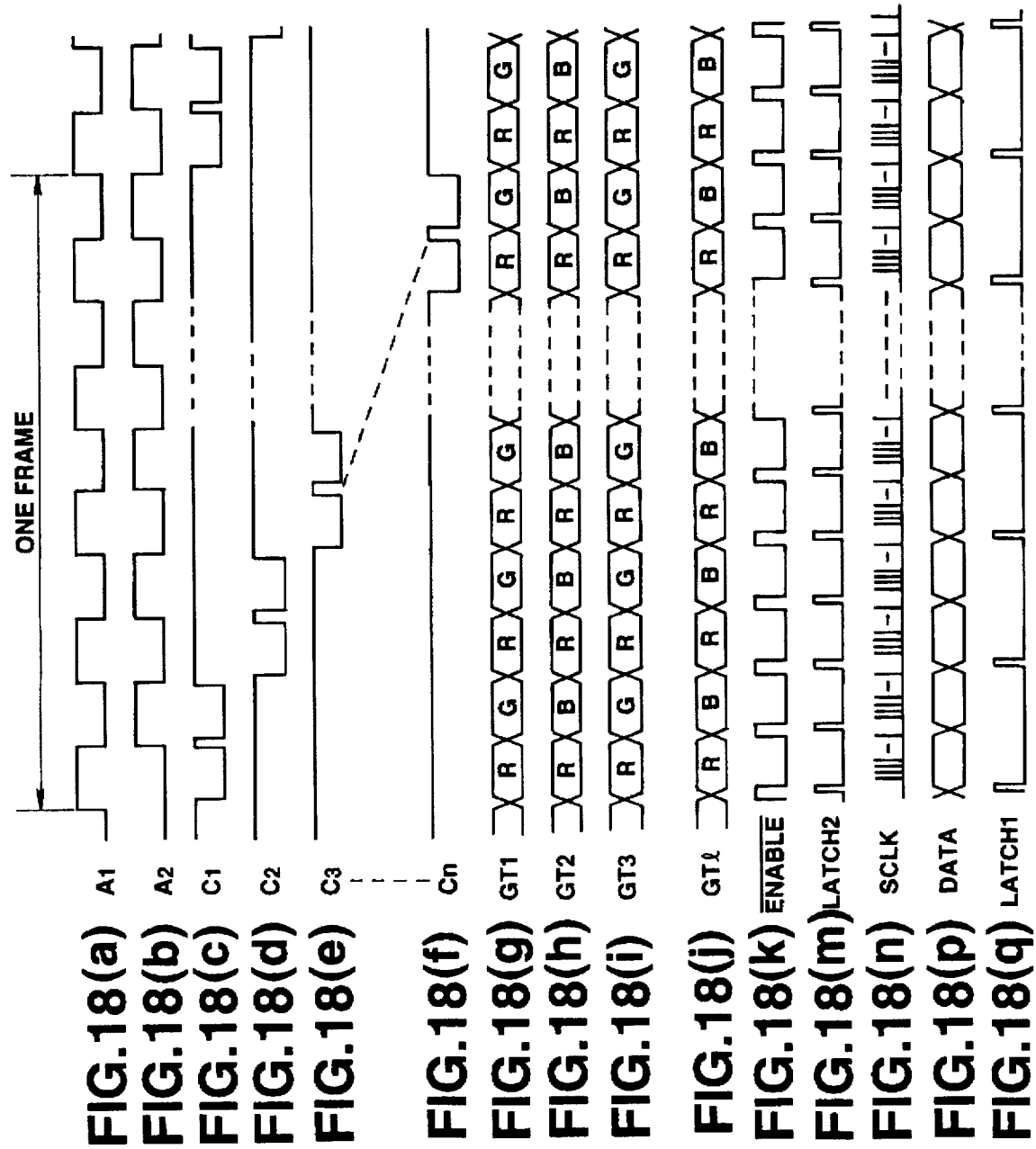

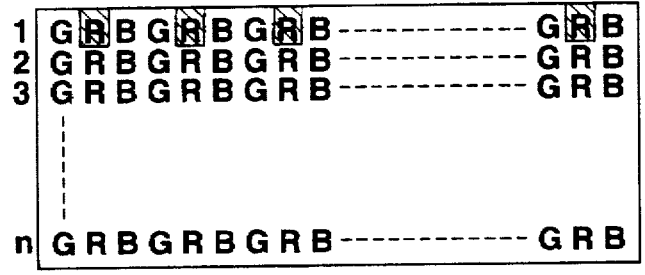
FIG.19(a) ANODE A1 CATHODE C1
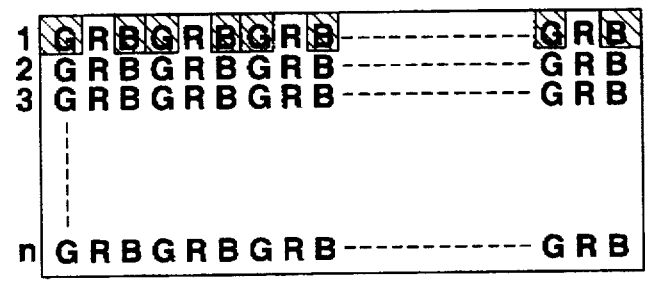
FIG.19(b) ANODE A2 CATHODE C1
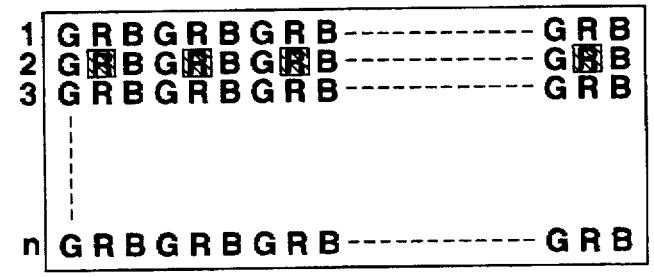
FIG.19(c) ANODE A1 CATHODE C2
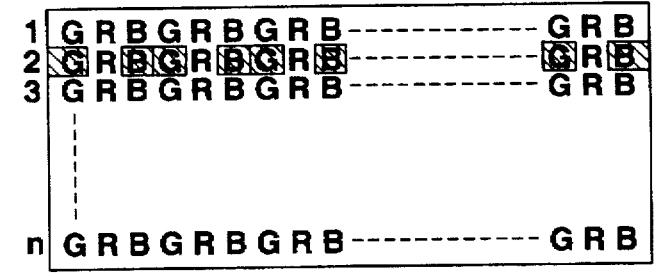
FIG.19(d) ANODE A2 CATHODE C2

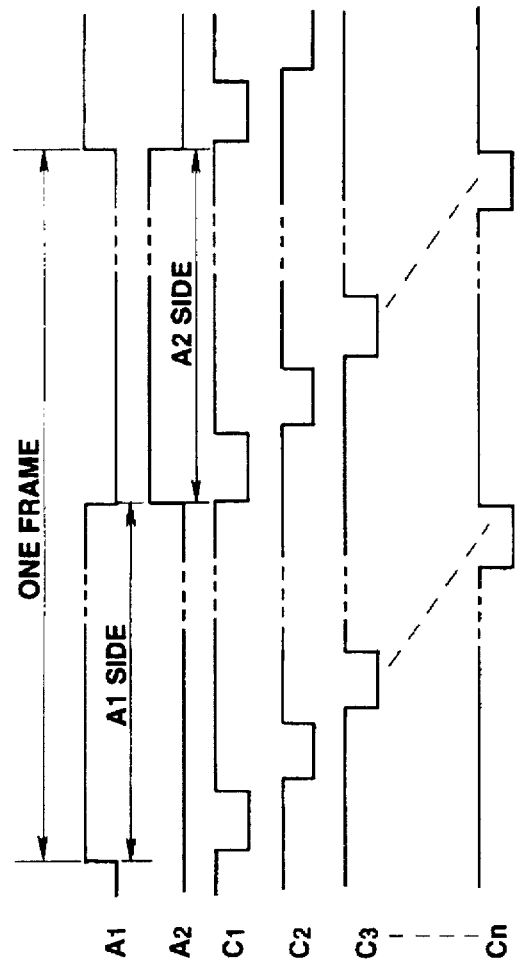

FIG.21(a) ANODE A1 CATHODE C1
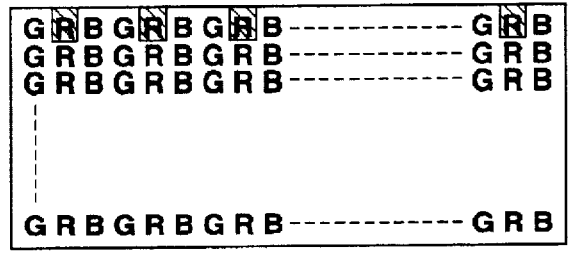
FIG.21(b) ANODE A1 CATHODE C2
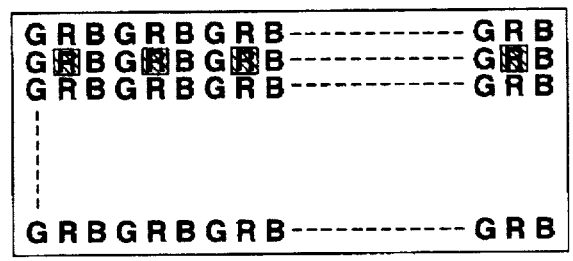
FIG.21(c) ANODE A2 CATHODE C1
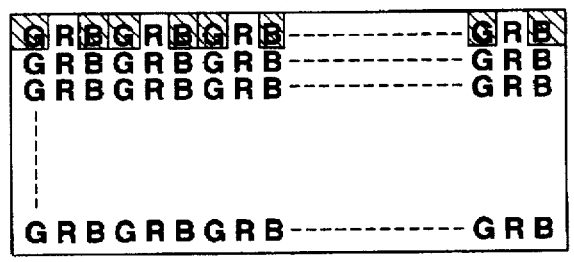
FIG.21(d) ANODE A2 CATHODE C2
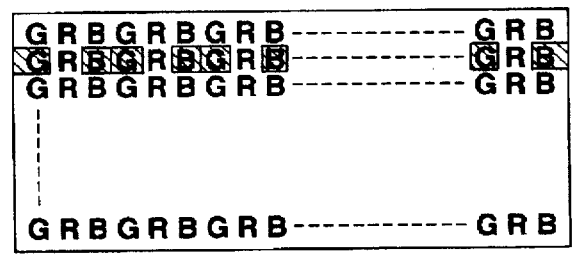

# IMAGE DISPLAY DEVICE AND DRIVE DEVICE THEREFOR

This application is a Continuation of application Ser. No. 08/251,245, filed on May 31, 1994, now abandoned.

BACKGROUND OF THE INVENTION

This invention relates to an electron emission element of the field emission type suitable for use for a microwave vacuum tube, a light source, an amplification element, a high-speed switching element, a sensor or the like and an image display device using such an electron emission element as a cathode, and more particularly to an electron emission element conveniently applicable to a color display device in which a field emission cathode is incorporated.

Application of an electric field of about $10^9$ V/m to a metal surface or a semiconductor surface causes electrons to pass through a barrier by a tunnel effect, resulting in the electrons being discharged into a vacuum atmosphere even at a normal temperature. Such a phenomenon is called field emission and a cathode constructed so as to emit electrons based on such a principle is called a field emission cathode (hereinafter also referred to as "FEC").

Recent progress in techniques for processing a semiconductor has led to development of an FEC of the surface-emission type including FEC arrays of a micron size.

Now, a conventional image display device will be described by way of example with reference to FIG. 28.

The conventional image display device includes an anode substrate 400 and a cathode substrate 401 arranged oppositely to each other and side plates (not shown) arranged so as to surround an outer periphery of each of the substrates 400 and 401, resulting in an envelope 402 being provided, which is then evacuated to a high vacuum. The anode substrate 400 is provided on an inner surface thereof with a display section 405 comprising a light-permeable anode conductor 403 and phosphor layers 404 deposited thereon.

The cathode substrate 401 is provided on an inner surface thereof opposite to the display section 405 of the anode substrate 400 with field emission elements each including emitter electrodes 406 of a conical shape. More particularly, the cathode substrate 401 is provided on the inner surface thereof with stripe-like cathode conductors 407, each of which is provided thereon with an insulating layer 409 formed with openings 408. The apertures 408 each are provided therein with an emitter electrode 406 acting as a conical electron emitter while being arranged on the cathode conductor 407. The insulating layer 409 is provided on an upper surface thereof with stripe-like gate electrodes 411 each formed with apertures 410 in a manner to be aligned with the openings 408 and arranged so as to extend in a direction across the cathode conductors 407.

Thus, the cathode conductors 407 and gate electrodes 411 cooperate with each other to form a matrix, so that when application of an anode voltage of a predetermined level to the display section 405 and driving of each of the cathode conductors 407 and gate electrodes 411 at a suitable timing permit the emitter electrodes 406 from which electrons are to be emitted to be selected, resulting in the phosphor layers 404 of the display section 405 opposite to the selected emitter electrodes 406 being selectively driven, leading to a desired luminous display.

In the conventional image display device, the emitter electrodes 406 each are formed into a conical shape and the gate electrodes 411 each are arranged so as to surround a tip end of each of the emitter electrodes 406, so that electrons emitted from the emitter electrodes 406 are caused to be spread at an angle of, for example, about 30 degrees on each of sides although it is of course that the spreading is somewhat varied depending on a voltage applied to the anode conductor 403 of the display section 405. Thus, when it is desired to obtain a display with high definition and fine picture cell pitches, it is required to decrease an interval between the field emission type cathodes and the display section or reduce a region in which the field emission type cathodes are arranged with respect to pitches of arrangement of picture cells. Otherwise, electrons diffused as described above are caused to impinge on adjacent picture cells, leading to leakage luminescence of the adjacent picture cells.

Unfortunately, in order to increase luminance of picture cells, it is required to increase an anode voltage of the display section. However, this requires to somewhat increase a distance between the display device and the cathodes, to thereby ensure insulation therebetween. For example, supposing that an anode voltage of 1 kV is applied to the display section 405, it is required that the interval between the phosphor layers 404 and the gate electrodes 411 is set to be 150 to 200 um.

Such an electron emission element of the field emission type as described above is widely used in the field of a microwave vacuum tube, a light source, an amplification element, a high-speed switching element, a sensor or the like.

Now, a display with high definition which is obtained at picture cell pitches as small as, for example, 0.33 mm or less in a display device of which a display is selected by means of gate electrodes and emitter electrodes will be discussed hereinafter. When it is desired to obtain such a display in the form of, for example, a full color display, it is required to construct a color display device in such a manner that picture cells which are constituted by phosphor layers R, G and B are formed into a width of about 80 um and arranged at intervals of about 20 um.

Supposing that a distance between the phosphor layers 404 and the gate electrodes 411 is set to be 150 um and an angle of spreading of electrons emitted by the conical emitter electrodes 406 is 30 degrees on each side, the electrons are caused to spread by a distance of about 80 um on each side. This leads to a failure in proper operation of a display device including picture cells having such dimensions as described above, to thereby fail to provide the display with such high definition as described above. On the contrary, a decrease in distance between the phosphor layers 404 and the gate electrodes 411 to about 50 um permits spreading of the electrons to be minimized. However, this renders an increase in anode voltage impossible in view of dielectric strength, leading to a decrease in luminance.

Also, when spreading of electrons emitted occurs in a microwave vacuum tube, a light source, an amplification element, a high-speed switching element, a sensor or the like in which the above-described field emission element is incorporated, the amount of electrons reaching an anode (collector) is reduced, leading to a deterioration in S/N ratio with respect to input power or a failure to increase sensitivity, to thereby render light emission unstable.

A field emission cathode (FEC) is generally formed into a planar configuration, so that a field emission cathode of the surface emission type may be provided. Thus, application of such a field emission cathode of the surface emission type to a color display device has been proposed. Such a conventional color display device may be generally constructed in such a manner as shown in FIG. 23.

More particularly, a second substrate 105 arranged opposite to a first substrate 101 is provided thereon with a plurality of anode electrode groups each including three stripe-like anode electrode elements 106-1, 106-2 and 106-3 which are provided thereon with a phosphor (R) of a red luminous color, a phosphor (G) of a green luminous color and a phosphor (B) of a blue luminous color, respectively. The stripe-like anode electrode elements 106-1, 106-2 and 106-3 for the phosphors of the respective luminous colors are commonly connected to anode lead-out electrodes A1, A2 and A3, respectively, which are then led out of the second substrate 105.

The first substrate 101 is formed thereon with cathode electrodes 102, each of which is formed thereon with emitter arrays 104 including a plurality of conical emitters for field-emitting electrons. Each of the cathode electrodes 102 is formed thereon with gate electrodes 103 while keeping the gate electrodes 103 insulated from the cathode electrode 102.

Thus, the anode electrode elements 106-1 cooperate with each other to form an anode electrode for emitting only light of a red luminous color, the anode electrode elements 106-2 form an anode electrode for emitting only light of a green luminous color and the anode electrode elements 106-3 form an anode electrode for emitting only light of a blur luminous color.

Arrangement of the above-described electrodes is shown in FIG. 22, which is viewed from a side of the anode electrodes. As shown in FIG. 22, the anode lead-out electrodes A1, A2 and A3 are led out of the anode electrode elements 106-1, 106-2 and 106-3 on both sides of the substrate, respectively. The gate electrodes 103 (103-1, 103-2, - - - , 103-1) are formed in a manner to be spaced from and parallel to the anode electrode elements 106-1 to 106-3. The gate electrodes 103 each are prbvided with gate lead-out electrodes GT1, GT2, - - - , GT1 in a manner to be led out thereof, respectively.

In order that the emitter arrays 104 (104-1, 104-2, - - - ) from which emission of electrons is controlled by the gate electrodes 103-1, 103-2, - - - , 103-1 cause each one set of picture cells R, G and B to emit light, the gate electrodes 103-1, 103-2, - - - , 103-1 are formed so as to straddle the anode electrode elements 106-1 to 106-3 corresponding to each one set of picture cells R, G and B.

The cathode electrodes 102 are formed into a stripe-like shape and arranged below the gate electrodes 103-1, 103-2, - - - , 103-1 so as to extend in a direction perpendicular to the anode electrodes 106-1 to 106-3. Also, the cathode electrodes 102 are provided with cathode lead-out electrode C1, C2, - - - , Cn in a manner to be led out thereof, respectively. The emitter arrays 104 are arranged on each of the cathode electrodes 102. The anode electrode elements 106-1 each have the phosphor R of a red luminous color deposited thereon, the anode electrode elements 106-2 each have the phosphor G of a green luminous color deposited thereon, and the anode electrode elements 106-3 each have the phosphor B of a blue luminous color deposited thereon.

In order to cause the color display device constructed as described above to display a color image, a contact a1 to which the lead-out electrode A1 of each of the anode electrode elements 106-1 is connected is selected through changing-over of a switch 100 to cause an anode voltage Ea to be applied to the anode electrode elements 106-1. Concurrently, selection of the cathode electrodes 102 is carried out by closing a switch 110 and color data on a red luminous color are fed to the gate lead-out electrodes GT1, GT2, - - - , GT1 to cause the display device to display an image of a red luminous color on one line. Then, the cathode lead-out electrodes C1 to Cn are scanned in turn to cause the display device to display an image of a red luminous color.

Subsequently, the switch 100 is changed over to a position of a contact a2 to which the anode lead-out electrode A2 is connected, to thereby cause the anode voltage Ea to be applied to the anode electrode elements 106-2. Concurrently, the cathode lead-out electrodes C1 to Cn are scanned in turn and data on a green luminous color are fed to the gate electrodes GT1 to GT1 in synchronism with the scanning, resulting in the display device displaying an image of a green luminous color.

Thereafter, the switch 100 is changed over to a position of a contact a3 to which the anode lead-out electrode A3 is connected to cause the anode voltage Ea to be applied to the anode electrode elements 106-3. Concurrently, the cathode lead-out electrodes C1 to Cn are scanned in turn and data on a blue luminous color are fed to the gate electrodes GT1 to GT1 in synchronism with the canning, to thereby cause the display device to display an image of a blue luminous color. Thus, the conventional color display device displays a color image according to a surface sequential system.

In the conventional color display device in which the anode electrodes each are constituted by the three anode electrode elements, it is required to lead out each three anode lead-out electrodes A1, A2 and A3 from the second substrate 105 because the anode electrode elements 106-1, 106-2 and 106-3 are formed on the second substrate 105. Unfortunately, leading-out of each three anode lead-out electrodes A1, A2 and A3 from the second substrate causes multi-level crossing of the electrodes as indicated at reference characters a, b and c in FIG. 22, so that it is required to arrange the electrodes in a three-dimensional wiring manner.

Also, each of the anode electrodes is formed of three anode electrode elements, therefore, a duty determined by the number of times of scanning of the cathode lead-out electrodes C1 to Cn is reduced to a level of ⅓, resulting in an image plane of the display device being decreased in brightness.

In order to solve the above-described problems, it would be considered that a construction of the color display device in such a manner that only one anode lead-out electrode is arranged and the cathode lead-out electrodes and gate lead-out electrodes are scanned to selectively drive the phosphors R, G and B arranged on the anode electrode elements permits the display device to display a color image while eliminating the above-described three-dimensional arrangement or wiring of the anode lead-out electrodes. However, such a construction of the display device fails to prevent bleeding of an image due to leakage luminescence of adjacent phosphors because electrons emitted from the cathode electrodes reach the anode electrodes while spreading to a degree, as will be understood from the widely-known fact that electrons emitted from cathode electrodes generally travel to anodes while spreading at an angle of about 30 degrees.

Also, in the conventional image display device in which the field emission cathodes are incorporated, a voltage applied to the anode electrodes is within a range between hundreds volts and thousands bolts, to thereby fail to meet all luminous characteristics of the phosphors such as luminous efficiency, color purity, durability and the like. Thus, when it is desired to directly observe luminescence from the phosphors, the image display device fails to permit the phosphors to exhibit desired luminarice. In particular, the conventional image display device causes the phosphor of a red luminous color to be deteriorated in luminous characteristics or efficiency as compared with the phosphors of other luminous colors.

Further, the conventional image display device uses a filter in order to increase color purity of a display and contrast thereof to obtain a plurality of luminous colors from the same phosphor. Unfortunately use of the filter substantially fails to permit the phosphors to exhibit desired luminescence and luminance and causes non-uniformity in luminescence and luminance between the phosphors.

SUMMARY OF THE INVENTION

The present invention has been made in view of the foregoing disadvantages of the prior art.

Accordingly, it is an object of the present invention to provide an image display device which is capable of permitting anode lead-out electrodes for anode electrodes to be led out of the anode electrodes without multi-level crossing of the anode lead-out electrodes.

It is another object of the present invention to provide an image display device which is capable of providing a color image free of any bleeding of luminous color.

It is a further object of the present invention to provide an image display device which is capable of significantly increasing duty in image displaying to provide balanced luminescence and luminance irrespective of a luminous color of a phosphor.

It is still another object of the present invention to provide a drive circuit for an image display device which is capable of permitting anode lead-out electrodes for anode electrodes to be led out of the anode electrodes without multi-level crossing of the anode lead-out electrodes.

It is yet another object of the present invention a drive circuit for an image display device which is capable of permitting the image display device to provide a color image free of any bleeding of luminous color.

It is even another object of the present invention to provide a drive circuit for an image display device which is capable of permitting the image display device to significantly increase duty in image displaying to provide balanced luminescence and luminance irrespective of a luminous color of a phosphor.

In accordance with one aspect of the present invention, an image display device is provided. The image display device includes an airtight envelope including an anode substrate and a cathode substrate arranged so as to be opposite to each other, cathodes electron emitting elements of the field emission type which include cathode conductors arranged on an inner surface of the cathode substrate, emitter electrodes provided on each of the cathode conductors and gate electrodes arranged on each of the cathode conductors through an insulating layer, and a display section formed on an inner surface of the anode substrate. The gate electrodes each have a selection voltage applied thereto to cause electrons emitted from the emitter electrodes to impinge on the display section, resulting in the display section carrying out a luminous display. The device also includes diffusion prevention electrodes arranged on the same plane as the gate electrodes in a manner to interpose each of the gate electrodes between each adjacent two of the diffusion prevention electrodes and applied thereto a voltage lower than the selection voltage when the selection voltage is applied to at least the gate electrodes positioned in proximity to the diffusion prevention electrodes, to thereby prevent diffusion of electrons emitted from the emitter electrodes.

In accordance with this aspect of the present invention, an image display device is provided. The image display device includes a first substrate, a plurality of stripe-like cathode electrodes formed on the first substrate and including emitters for field-emitting electrons, cathode lead-out electrodes led out of the cathode electrodes, respectively, a plurality of stripe-like gate electrodes arranged on the cathode electrodes in a manner to be perpendicular to the cathode electrodes while being kept insulated from the cathode electrodes, gate lead-out electrodes led out of the gate electrodes, a second substrate arranged in a manner to be spaced by a predetermined distance from the first substrate, stripe-like anode electrodes formed on the second substrate in a manner to be opposite to the gate electrodes and perpendicular to the cathode electrodes, two anode lead-out electrodes alternately connected to the stripe-like anode electrodes and led out of the anode electrodes on both sides of the second substrate, respectively, and phosphors arranged on the stripe-like anode electrodes in turn, to thereby provide red, blue and green luminous colors.

In a preferred embodiment, the red, blue and green luminous colors may be obtained through a filter means.

In a preferred embodiment of the present invention, each one of the stripe-like gate electrodes is positioned below each adjacent two of the stripe-like anode electrodes, so that each one gate electrode controls luminescence of the phosphors arranged on each two anode electrodes.

Also, in accordance with this aspect of the present invention, an image display device is provided. The image display device includes a first substrate, a plurality of stripe-like cathode electrodes formed on the first substrate and including emitters for field-emitting electrons, cathode lead-out electrodes led out of the cathode electrodes, respectively, a plurality of stripe-like gate electrodes arranged on the cathode electrodes in a manner to be perpendicular to the cathode electrodes while being kept insulated from the cathode electrodes, gate lead-out electrodes led out of the gate electrodes, respectively, a second substrate arranged in a manner to be spaced by a predetermined distance from the first substrate, stripe-like anode electrodes formed on the second substrate in a manner to be opposite to the gate electrodes and perpendicular to the cathode electrodes and provided thereon with phosphors of red, blue and green luminous colors in turn, a first anode lead-out electrode to which the first anode electrode having the phosphor of the worst luminous efficiency provided thereon is connected, and a second anode lead-out electrode to which the second anode electrodes having the remaining phosphors formed thereon are connected. The stripe-like gate electrodes are so arranged that two such gate electrodes are positioned below the first anode electrodes and one such gate electrode is positioned below the second anode electrodes.

Further, in accordance with this aspect of the present invention, an image display device is provided. The image display device includes a first substrate, a plurality of stripe-like cathode electrodes formed on the first substrate and including emitters for field-emitting electrons, cathode lead-out electrodes led out of the cathode electrodes, respectively, a plurality of stripe-like gate electrodes arranged on the cathode electrodes in a manner to be perpendicular to the cathode electrodes while being kept insulated from the cathode electrodes, gate lead-out electrodes led out of the gate electrodes, respectively, a second substrate arranged in a manner to be spaced by a predetermined distance from the first substrate, and stripe-like anode electrodes formed on the second substrate in a manner to be opposite to the gate electrodes and perpendicular to the cathode electrodes. The stripe-like anode electrodes are provided thereon with phosphors, respectively. The device also includes a filter means arranged for permitting lights emitted from the phosphors to pass therethrough, to thereby obtain red, blue and green luminous colors from the anode electrodes in turn, a first anode lead-out electrode to which the first anode electrode having the phosphor of the worst luminous efficiency provided thereon is connected, and a second anode lead-out electrode to which the second anode electrodes having the remaining phosphors formed thereon are connected. The stripe-like gate electrodes are so arranged that two such gate electrodes are positioned below the first anode electrodes and one such gate electrode is positioned below the second anode electrodes.

In a preferred embodiment of the present invention, the image display device further includes a control electrode arranged between each adjacent two of the gate electrodes for controlling spreading of electrons emitted from the emitters.

In accordance with another aspect of the present invention, a drive device for an image display device is provided. The drive device includes a first substrate, a plurality of stripe-like cathode electrodes formed on the first substrate and including emitters for field-emitting electrons, cathode lead-out electrodes led out of the cathode electrodes, respectively, a plurality of stripe-like gate electrodes arranged on the cathode electrodes in a manner to be perpendicular to the cathode electrodes while being kept insulated from the cathode electrodes, gate lead-out electrodes led out of the gate electrodes, a second substrate arranged in a manner to be spaced by a predetermined distance from the first substrate, stripe-like anode electrodes formed on the second substrate in a manner to be opposite to the gate electrodes and perpendicular to the cathode electrodes, two anode lead-out electrodes alternately connected to the stripe-like anode electrodes and led out of the anode electrodes on both sides of the second substrate, respectively, phosphors respectively arranged on the stripe-like anode electrodes, to thereby provide red, blue and green luminous colors in turn, and a scanning means for scanning the cathode lead-out electrodes in turn while one of the anode lead-out electrodes is kept selected and then scanning the cathode lead-out electrodes in turn while the other of the anode lead-out electrodes is kept selected. The scanning means permits the image display device to display an image.

In a preferred embodiment of the present invention, color data corresponding to scanning of the cathode lead-out electrodes are fed to the gate lead-out electrodes in synchronism with the scanning of the cathode lead-out electrodes.

In accordance with this aspect of the present invention, a drive device for an image display device is provided. The drive device includes a first substrate, a plurality of stripe-like cathode electrodes formed on the first substrate and including emitters for field-emitting electrons, cathode lead-out electrodes led out of the cathode electrodes, respectively, a plurality of stripe-like gate electrodes arranged on the cathode electrodes in a manner to be perpendicular to the cathode electrodes while being kept insulated from the cathode electrodes, gate lead-out electrodes led out of the gate electrodes, a second substrate arranged so as to be spaced by a predetermined distance from the first substrate, stripe-like anode electrodes formed on the second substrate in a manner to be opposite to the gate electrodes and perpendicular to the cathode electrodes, two anode lead-out electrodes alternately connected to the stripe-like anode electrodes and led out of the anode electrodes on both sides of the second substrate, respectively, phosphors respectively arranged on the stripe-like anode electrodes, to thereby provide red, blue and green luminous colors in turn, a first scanning means for scanning the cathode lead-out electrodes in turn, and a second scanning means for scanning the anode lead-out electrodes while one of the cathode lead-out electrodes is kept selectively scanned. The first and second scanning means permit the image display device to display an image.

In accordance with a further aspect of the present invention, there is provided an image display drive device for an image display device which includes a first substrate, a plurality of stripe-like cathode electrodes formed on the first substrate and including emitters for field-emitting electrons, cathode lead-out electrodes led out of the cathode electrodes, respectively, a plurality of stripe-like gate electrodes arranged on the cathode electrodes in a manner to be perpendicular to the cathode electrodes while being kept insulated from the cathode electrodes, gate lead-out electrodes led out of the gate electrodes, respectively, a second substrate arranged in a manner to be spaced by a predetermined distance from the first substrate, stripe-like anode electrodes formed on the second substrate in a manner to be opposite to the gate electrodes and perpendicular to the cathode electrodes and provided thereon with phosphors of red, blue and green luminous colors in turn, a first anode lead-out electrode to which the first anode electrode having the phosphor of the worst luminous efficiency provided thereon is connected, and a second anode lead-out electrode to which the second anode electrodes having the remaining phosphors formed thereon are connected. The stripe-like gate electrodes are so arranged that two such gate electrodes are positioned below the first anode electrodes and one such gate electrode is positioned below the second anode electrodes. The image display drive device is featured in that the cathode lead-out electrodes are fully scanned in turn while one of the anode lead-out electrodes is kept selected and then the cathode lead-out electrodes are fully scanned while the other of the anode lead-out electrodes is kept selected, resulting in an image for one frame being displayed on the image display device.

Also, in accordance with this aspect of the present invention, there is provided an image display drive device for an image display device which includes a first substrate, a plurality of stripe-like cathode electrodes formed on the first substrate and including emitters for field-emitting electrons, cathode lead-out electrodes led out of the cathode electrodes, respectively, a plurality of stripe-like gate electrodes arranged on the cathode electrodes in a manner to be perpendicular to the cathode electrodes while being kept insulated from the cathode electrodes, gate lead-out electrodes led out of the gate electrodes, respectively, a second substrate arranged in a manner to be spaced by a predetermined distance from the first substrate, stripe-like anode electrodes formed on the second substrate in a manner to be opposite to the gate electrodes and perpendicular to the cathode electrodes and provided thereon with phosphors, respectively, a filter means arranged for permitting lights emitted from the phosphors to pass therethrough, to thereby provide red, blue and green luminous colors from the anode electrodes in turn, a first anode lead-out electrode to which the first anode electrode having the phosphor of the worst luminous efficiency provided thereon is connected, and a second anode lead-out electrode to which the second anode electrodes having the remaining phosphors formed thereon are connected. The stripe-like gate electrodes are so arranged that two such gate electrodes are positioned below the first anode electrodes and one such gate electrode is positioned below the second anode electrodes. The image display drive device is featured in that the cathode lead-out electrodes are fully scanned in turn while one of the anode lead-out electrodes is kept selected and then the cathode lead-out electrodes are fully scanned while the other of the anode lead-out electrodes is kept selected, resulting in an image for one frame being displayed on the image display device.

Further, in accordance with this aspect of the present invention, there is provided image display drive device for an image display device which includes a first substrate, a plurality of stripe-like cathode electrodes formed on the first substrate and including emitters for field-emitting electrons, cathode lead-out electrodes led out of the cathode electrodes, respectively, a plurality of stripe-like gate electrodes arranged on the cathode electrodes in a manner to be perpendicular to the cathode electrodes while being kept insulated from the cathode electrodes, gate lead-out electrodes led out of the gate electrodes, respectively, a second substrate arranged in a manner to be spaced by a predetermined distance from the first substrate, stripe-like anode electrodes formed on the second substrate in a manner to be opposite to the gate electrodes and perpendicular to the cathode electrodes and provided thereon with phosphors of red, blue and green luminous colors in turn, a first anode lead-out electrode to which the first anode electrode having the phosphor of the worst luminous efficiency provided thereon is connected, and a second anode lead-out electrode to which the second anode electrodes having the remaining phosphors formed thereon are connected. The stripe-like gate electrodes are so arranged that two such gate electrodes are positioned below the first anode electrodes and one such gate electrode is positioned below the second anode electrodes. The image display drive device is featured in that the cathode lead-out electrodes are scanned in turn and the first and second anode electrodes are scanned while one of the cathode lead-out electrodes is kept selectively scanned, so that the cathode lead-out electrodes are fully scanned to cause an image for one frame to be displayed on the image display device.

Furthermore, in accordance with this aspect of the present invention, there is provided an image display drive device for an image display device which includes a first substrate, a plurality of stripe-like cathode electrodes formed on the first substrate and including emitters for field-emitting electrons, cathode lead-out electrodes led out of the cathode electrodes, respectively, a plurality of stripe-like gate electrodes arranged on the cathode electrodes in a manner to be perpendicular to the cathode electrodes while being kept insulated from the cathode electrodes, gate lead-out electrodes led out of the gate electrodes, respectively, a second substrate arranged in a manner to be spaced by a predetermined distance from the first substrate, stripe-like anode electrodes formed on the second substrate in a manner to be opposite to the gate electrodes and perpendicular to the cathode electrodes and provided thereon with phosphors, respectively, a filter means arranged for permitting lights emitted from the phosphors to pass therethrough, to thereby obtain red, blue and green luminous colors from the anode electrodes in turn, a first anode lead-out electrode to which the first anode electrode having the phosphor of the worst luminous efficiency provided thereon is connected, and a second anode lead-out electrode to which the second anode electrodes having the remaining phosphors formed thereon are connected. The stripe-like gate electrodes are so arranged that two such gate electrodes are positioned below the first anode electrodes and one such gate electrode is positioned below the second anode electrodes. The image display drive circuit is featured in that the cathode lead-out electrodes are scanned in turn and the first and second anode electrodes are scanned while one of the cathode lead-out electrodes is kept selectively scanned, so that the cathode lead-out electrodes are fully scanned to cause an image for one frame to be displayed on the image display device.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein:

FIGS. 9(a) to 9(k), 9(m), 9(n) and 9(p) each are a timing chart of the drive device shown in FIG. 8;

FIGS. 10(a) to 10(d) each are a schematic view showing selection of picture cells by the drive device of FIG. 8;

FIGS. 12(a) to 12(f), 12(m), 12(o) and 12(p) each are a timing chart of the drive device shown in FIG. 11;

FIG. 13(a) to 13(d) each are a schematic view showing selection of picture cells by the drive device of FIG. 11;

FIGS. 14 and 15 each are a sectional view showing another embodiment of an image display device according to the present invention;

FIGS. 18(a) to 18(k), 18(m), 18(n), 18(p) and 18(q) each are a timing chart of a drive circuit for the image display device of each of FIGS. 14 and 15;

FIGS. 19(a) to 19(d) each are a schematic view showing selection of picture cells by the drive device of each of FIGS. 14 and 15;

FIGS. 20(a) to 20(k), 20(m), 20(n) and 20(p) each are a timing chart of another drive circuit for the image display device of each of FIGS. 14 and 15;

FIGS. 21(a) to 21(d) each are a schematic view showing another selection of picture cells by the drive device of each of FIGS. 14 and 15;

DETAILED DESCRIPTION OF THE PREFERRED EMBODIMENTS

Now, the present invention will be described hereinafter with reference to accompanying drawings.

Figure 24:
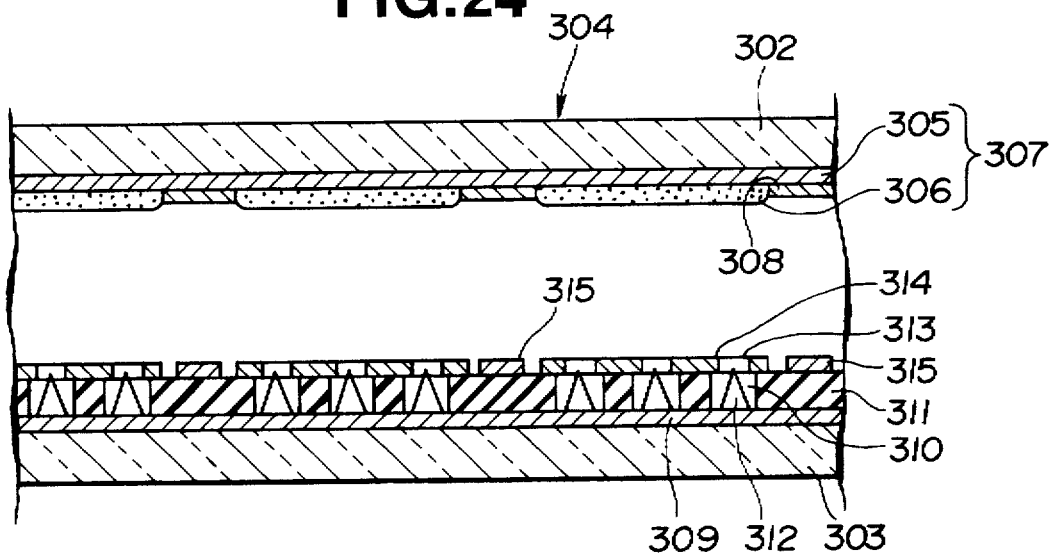
FIG. 24 is fragmentary sectional view showing another embodiment of an image display device according to the present invention.
Figure 25:
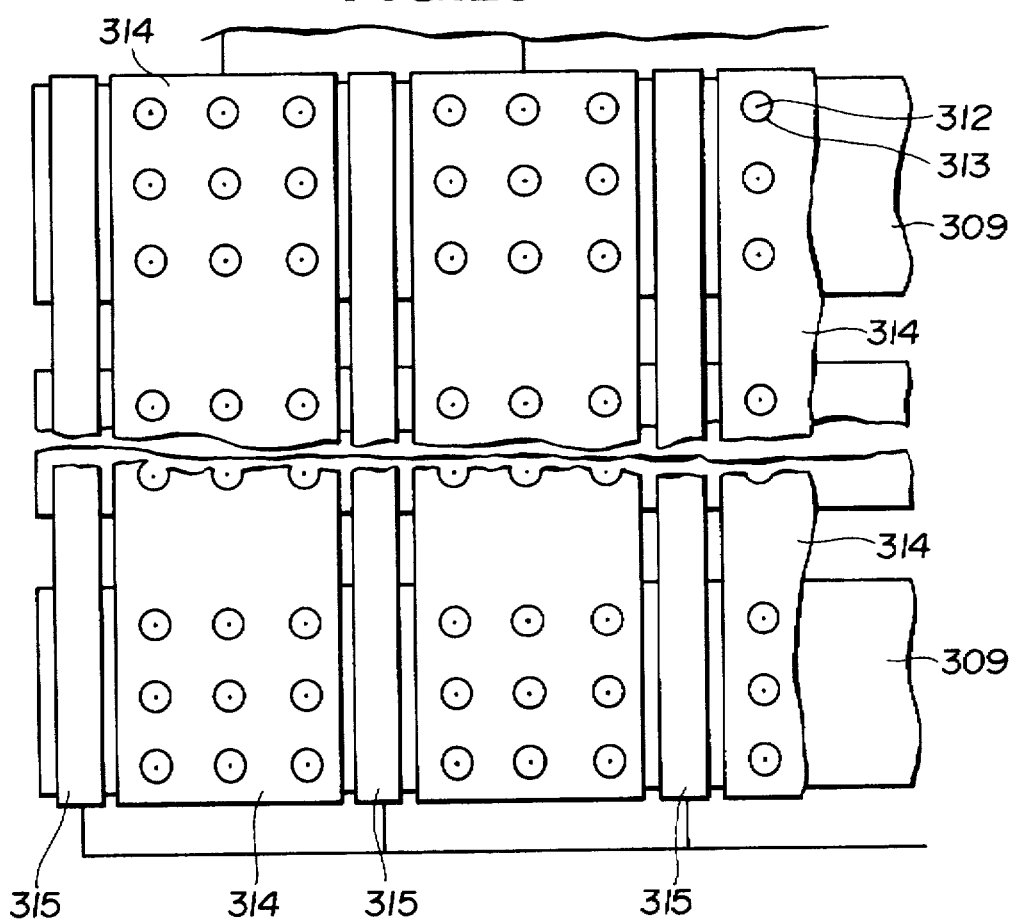
FIG. 25 is a plan view showing a cathode substrate in the image display device of FIG. 24.
Figure 26:
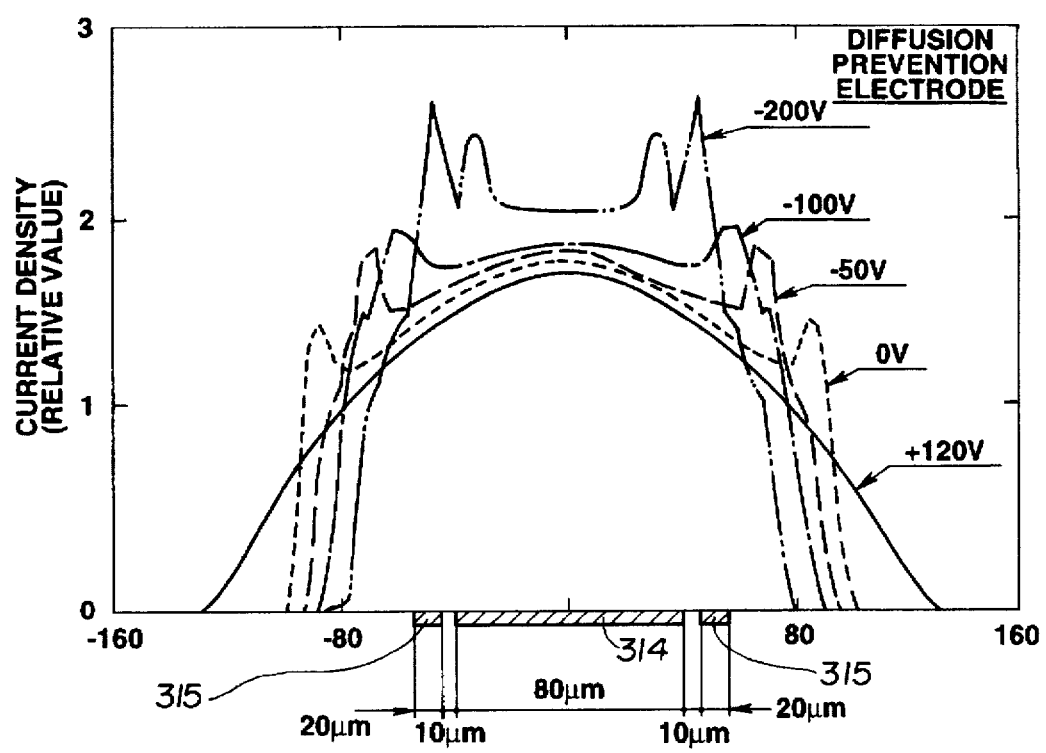
FIG. 26 is a graphical representation showing a current density distribution indicating electron diffusion prevention in the image display device of FIG. 24.

Referring first to FIGS. 24 to 26, an embodiment of an image display device according to the present invention in which electron emitting elements are incorporated is illustrated.

An image display device of the first embodiment includes an anode substrate 302 and a cathode substrate 303 which are arranged in a manner to be opposite to each and spaced from other at a predetermined interval defined therebetween, and side plates (not shown) arranged between the anode substrate 302 and the cathode substrate 303, which cooperate with each other to form an envelope 304. The envelope 304 thus formed is then evacuated to a high vacuum.

The anode substrate 302 has a light-permeable anode conductor 305 formed all over an inner surface thereof. The anode conductor 305 is provided thereon with phosphor layers 306 of desired luminous colors in a dot-like or stripe-like manner, resulting in forming a display section 307. The anode conductor 305 is provided on a portion thereof interposed between each adjacent two phosphor layers 306 with a light shielding mask 308.

The cathode substrate 303 is formed thereof with a plurality of stripe-like cathode conductors 309, which are arranged so as to extend in a direction perpendicular to a direction of arrangement of the phosphor layers 306 and in a manner to be divided for every picture cell. The cathode conductors 309 each are provided thereon with an insulating layer 311 formed with openings 310. The openings 310 each are provided therein an emitter electrode 312 of a conical shape acting as an electron emitter or electron emitting element while being arranged on the cathode conductor 309.

The insulating layers 311 each are provided on an upper surface thereof with gate electrodes 314 each formed with apertures 313 in a manner to positionally correspond to or be aligned with the openings 310. The gate electrode 314 is formed into a stripe-like shape in a manner to correspond to each of the picture cells and arranged so as to extend in a direction parallel to the direction of arrangement of the phosphor layers 306.

The image display device also includes a plurality of diffusion prevention electrodes 315 each arranged between each adjacent two of the gate electrodes 314 in a stripe-like manner. The diffusion prevention electrodes 315 are electrically connected common to each other and each have a voltage lower than a section voltage applied to the gate electrodes constantly applied thereto.

FIG. 26 shows a relationship between a voltage applied to the diffusion prevention electrodes 315 and spreading of electrons, which is obtained when a gap defined between the gate electrode 314 and the phosphor 306 is set to be 150 um and the gate electrode 314 is formed into a width of 80 um. Also, a distance between the gate electrode 314 and the diffusion prevention electrode 315 is set to be 10 um and the diffusion prevention electrode 315 is formed into a width of 20 um. Further, the gate electrodes 314 each have a voltage of 120V applied thereto and the anode conductor 305 of the display section 307 has a voltage of 800V applied thereto. FIG. 26 indicates a tendency that a decrease in diffusion prevention voltage relative to the gate voltage leads to focusing of electrons.

Figure 27:
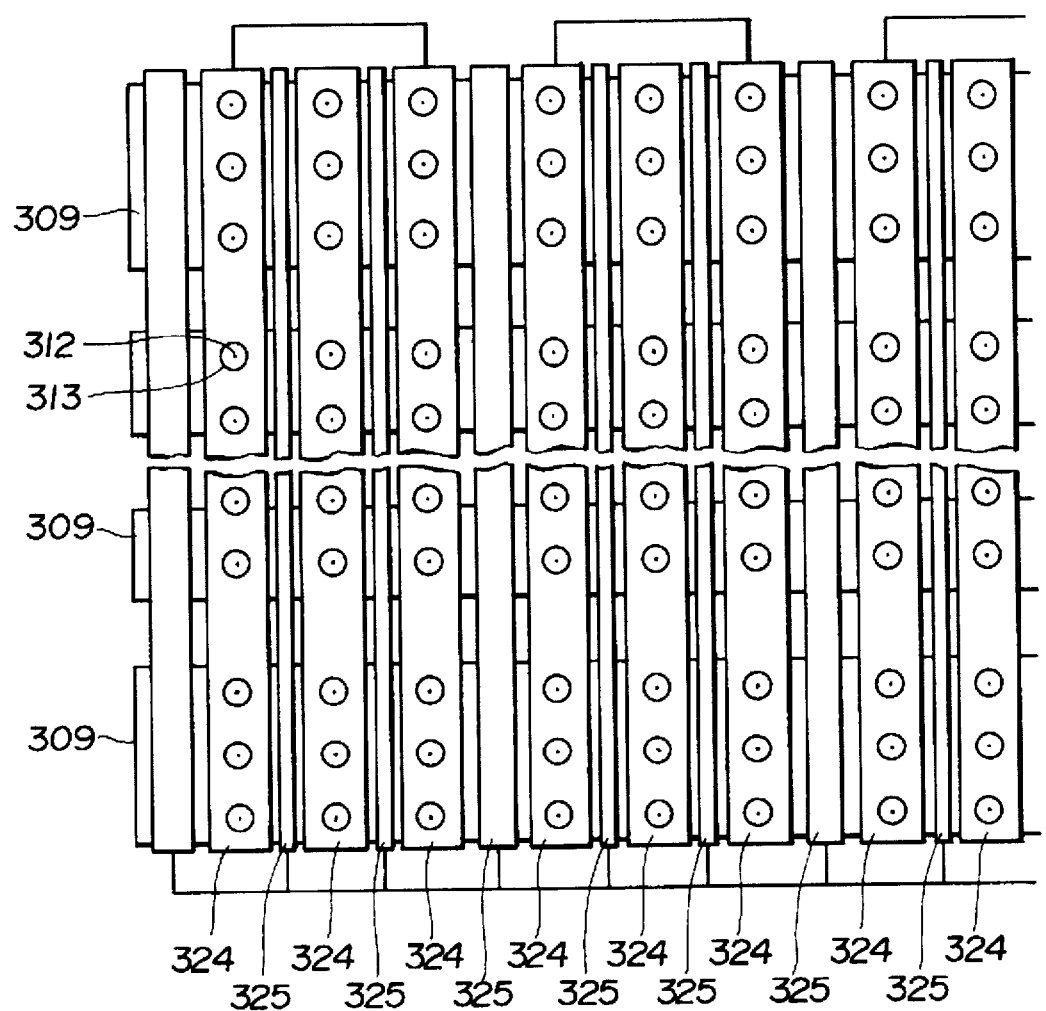
FIG. 27 is a plan view showing a cathode substrate in a further embodiment of an image display device according to the present invention.
Figure 28:
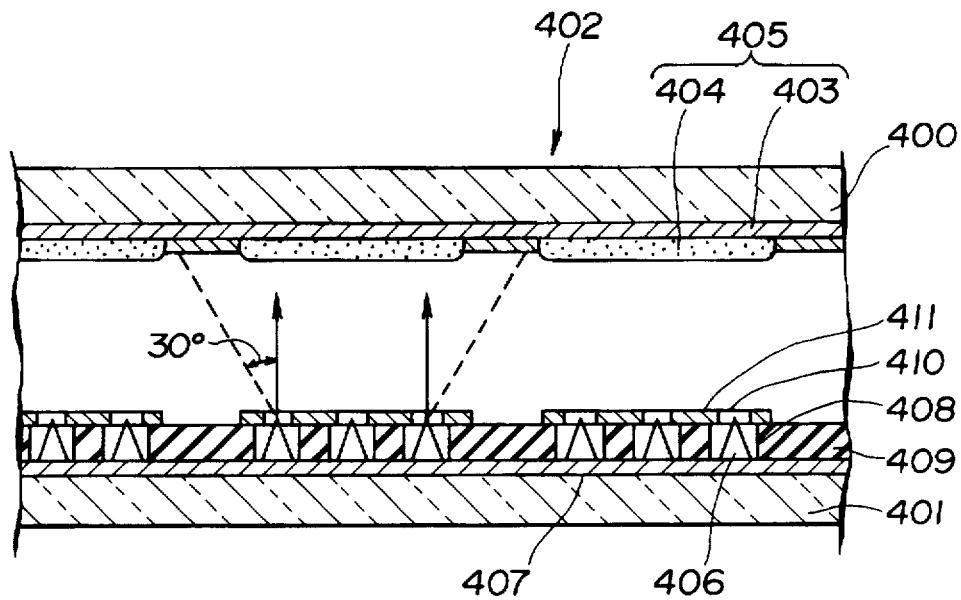
FIG. 28 is a sectional view showing a conventional image display device in which a field emission element is incorporated.

Referring now to FIG. 27, a second embodiment of an image display device according to the present invention is illustrated, wherein each gate electrode 314 to which the same voltage is applied is divided into a plurality of gate electrode elements 324. Also, a diffusion prevention electrode 325 is arranged between each adjacent two of the gate electrode elements 324 so as to extend therebetween. Such construction contributes to an increase in focusing of electrons.

In each of the embodiments described above, the gate electrodes 314 and diffusion prevention electrodes 315 are formed into a stripe-like shape and arranged so as to be parallel to each other. Alternatively, the gate electrode and diffusion prevention electrode corresponding to the gate electrode each are formed at at least a part thereof into a pectinate shape, so that both are combined together in a manner to bite each other at predetermined intervals. Although in each of the first and second embodiments described above, focusing of electrons is predominantly carried out in a direction of width of the stripe, the configuration of both electrodes into a pectinate shape permits focusing of electrons to be improved in two or more directions at the pectinate portion of the gate electrode surrounded by the pectinate portion of the diffusion prevention electrode.

In each of the embodiments described above, the diffusion prevention electrodes each have a voltage constantly applied thereto. Alternatively, a voltage may be applied to the diffusion prevention electrodes between which the the gate electrode is interposed, only when a selection voltage is applied to the gate electrode in synchronism with driving of the gate electrode.

Figure 1:
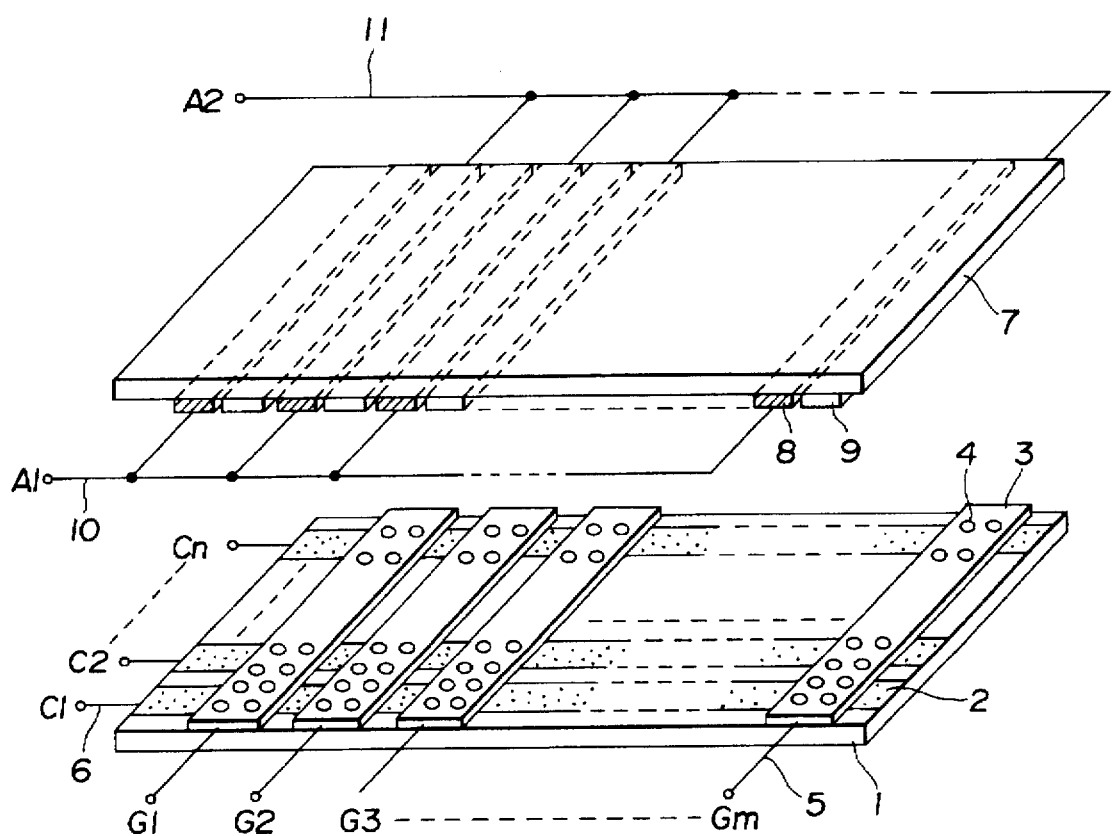
FIG. 1 is an exploded perspective view showing an embodiment of an image display device according to the present invention.

Referring now to FIG. 1, a third embodiment of an image display device according to the present invention is illustrated.

An image display device of the third embodiment includes a first substrate 1 formed thereon with cathode electrodes 2 of a stripe-like shape and gate electrodes 3 of a stripe-like shape. The gate electrodes 3 are arranged on the cathode electrodes 2 through an insulating layer in a manner to be perpendicular to the cathode electrodes 2. The gate electrodes 3 each are formed with openings 4 through which electrons field-emitted from emitters formed on each of the cathode electrodes 2 are discharged.

Reference numeral 5 designates gate lead-out electrodes (G1–Gm) led out of the gate electrodes 3, respectively, 6 designates cathode lead-out electrodes (C1–Cn) led out of the cathode electrodes 2, and 7 is a second substrate arranged opposite to the first substrate 1 and provided thereon with anode electrodes of a stripe-like shape. The anode electrodes includes first anode electrodes 8 of a stripe-like shape and second anode electrodes 9 of a stripe-like shape each arranged between each adjacent two of the first anode electrodes 8. Reference numeral 10 designates a first anode lead-out electrode (A1) led out of or connected to each of the first anode electrodes and 11 is a second anode lead-out electrode (A2) led out of or connected to each of the second anode electrodes 9. The stripe-like anode electrodes are provided thereon with phosphors R, G and B in turn and in a repeated manner.

Now, the manner of driving of the image display device of the third embodiment constructed as described above will be described hereinafter.

The first and second anode electrodes 8 and 9 are selected by the anode lead-out electrodes A1 and A2 for driving, respectively. The cathode electrodes 2 are selected in turn by scanning the cathode lead-out electrodes C1 to Cn.

For purpose of selectively driving the anode electrodes 8, the cathode lead-out electrodes C1 to Cn are scanned in turn while keeping a positive anode voltage applied to the anode lead-out electrode A1, during which color data on an image signal are kept applied to the gate lead-out electrodes G1 to Gm in synchronism with or in correspondence to a timing of the scanning. This results in picture cells of the phosphors provided on the anode electrodes 8 being excited by electrons emitted from the cathode electrodes scanned, to thereby be subject luminous control depending on the color data applied to the gate lead-out electrodes G1 to Gm.

Then, after scanning of the cathode lead-out electrodes C1 to Cn is carried out with respect to the last cathode lead-out electrode Cn, the positive anode voltage is then applied to the anode lead-out electrode A2. Subsequently, the cathode lead-out electrodes are scanned in turn in the same manner as described above, during which color data are applied to the gate lead-out electrodes G1 to Gm depending on the above-described scan timing. This results in picture cells of the phosphors of the anode electrodes 9 being excited by electrons emitted from the cathode lead-out electrodes C1 to Cn scanned and subject to luminous control depending on the color data applied to the gate lead-out electrodes, so that one image or an image for one frame may be displayed on the image display device.

Figure 2:
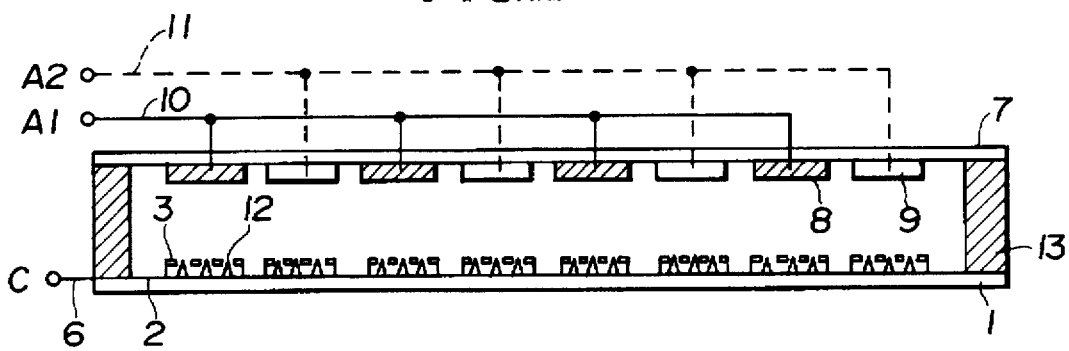
FIG. 2 is a sectional view showing a modification of the image display device of FIG. 1.
Figure 3:
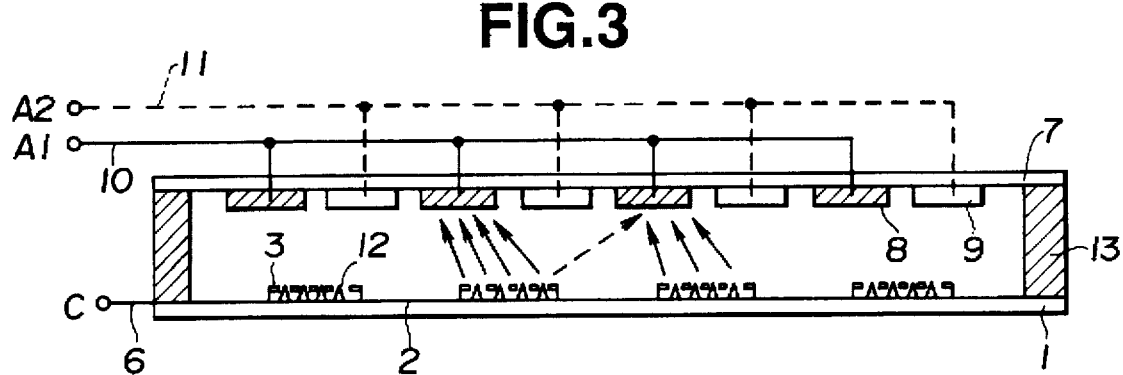
FIG. 3 is a sectional view showing another modification of the image display device of FIG. 1.
Figure 4:
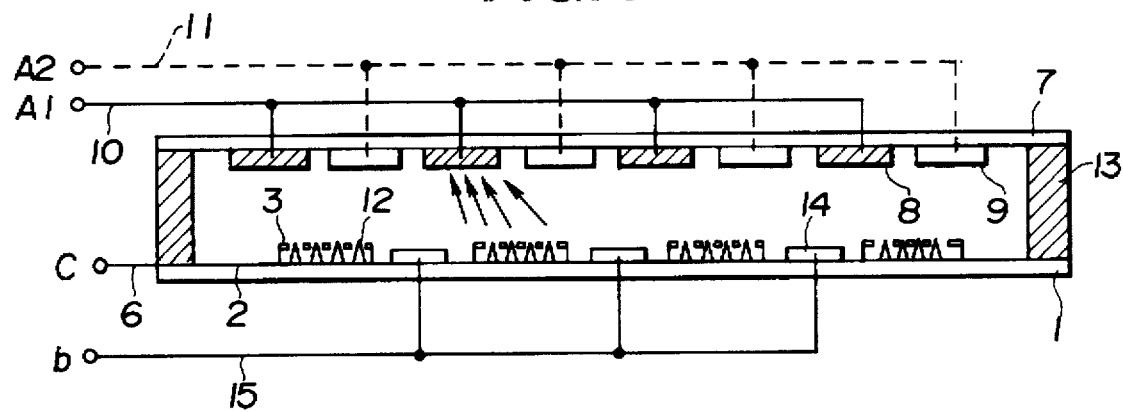
FIG. 4 is a sectional view showing a further modification of the image display device of FIG. 1.

Referring now to FIGS. 2 to 4, modifications of the image display device of FIG. 1 is illustrated.

In FIGS. 2 to 4, reference 1 designates a first substrate, 2 is stripe-like cathode electrodes formed on the first substrate 1, 3 is stripe-like gate electrodes formed on the cathode electrodes 2 through an insulator so as to extend in a direction perpendicular to the cathode electrodes 2, 6 is cathode lead-out electrodes led out of the cathode electrodes 2, 7 is a second substrate arranged opposite to the first substrate 1, 8 is first stripe-like anode electrodes formed on the second substrate 7, 9 is second stripe-like anode electrodes each arranged between each adjacent two of the first anode electrodes 8, 10 is a first anode lead-out electrode (A1) led out of each of the first anode electrodes 8, and 11 is a second anode lead-out electrode (A2) led out of each of the second anode electrodes 9.

Also, reference numeral 12 designates emitter arrays formed on each of the cathode electrodes 2 by integration techniques and each including a plurality of emitters of a conical shape for field-emitting electrons therefrom. 13 is spacers arranged between the first substrate 1 and the second substrate 7 for supporting the substrates in a manner to be spaced from each other at a predetermined interval. 14 is control electrodes each arranged between each adjacent two of the gate electrodes 3, and 15 is a lead-out electrode led out from each of the control electrodes 14 and serving to a control voltage to the control electrodes 14.

Figure 5:
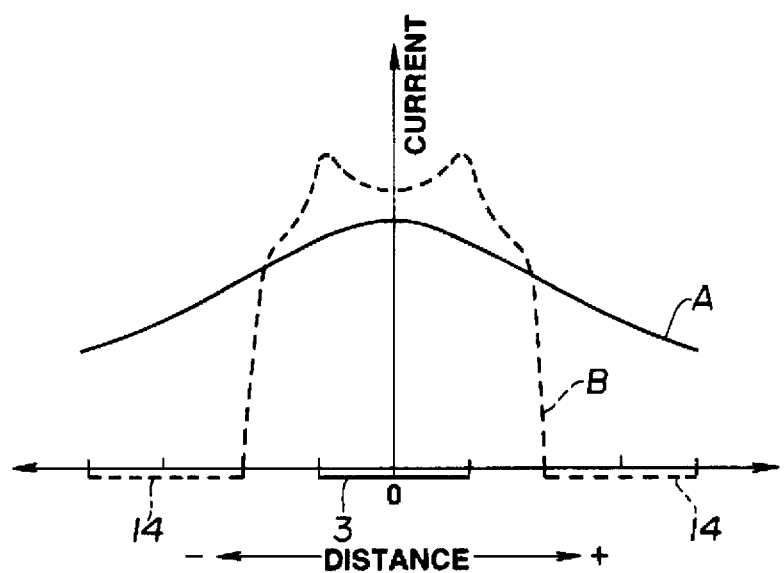
FIG. 5 is a graphical representation showing a current density distribution formed by electrons emitted from cathode electrodes.

In the image display device of FIG. 2, the stripe-like anode electrodes 3 are formed in a relationship of 1:1 to the first and second anode electrodes 8 and 9. A result of simulation of a current density distribution obtained by the image display device shown in FIG. 2 is indicated at reference character A in FIG. 5. It is known in the art that electrons field-emitted from the emitter arrays 12 spread at an angle of about 30 degrees, therefore, it is considered that the electrons reach the anode electrodes 8 and 9 while considerably spreading from an end of each of the gate electrodes 3, during which the current density distribution indicated at A in FIG. 5 is formed.

Now, driving for exciting the phosphors deposited on only one anode electrodes of the anode electrodes 8 and 9 will be described hereinafter.

Supposing that the phosphors are formed into a width of 80 um at pitches of 100 um on the abode electrodes 8 and 9, a positive anode voltage is applied to only one anode electrodes of the anode electrodes 8 and 9 or, for example, only the anode electrodes 8 and a negative anode voltage is applied to the other anode electrodes or the anode electrodes 9. This results in electrons being repelled by the anode electrodes 9 because the negative voltage is kept applied to the anode electrodes 9, so that only the phosphors deposited on the anode electrodes 8 are excited for luminescence or light emission.

Application of the anode voltages to the anode electrodes 8 and 9 in a manner contrary to the above permits the phosphors deposited on only the anode electrodes 9 to be excited for light emission or luminescence, to thereby prevent leakage luminescence due to spreading of electrons.

The image display device shown in FIG. 3 is so constructed that each one gate electrode 3 is arranged with respect to each one of the anode electrodes 8 and each one of the anode electrodes 9, thus, a relationship of the gate electrodes to the anode electrodes 8 and 9 is 1:2. The device of FIG. 3 is likewise driven so that a positive anode voltage is selectively applied to one of the anode lead-out electrodes A1 and A2 of the anode electrodes 8 and 9. Electrons emitted from the emitter arrays 12 are commonly fed to the anode electrodes 8 and 9 while being controlled by the gate electrodes 3, therefore, application of color data to the gate electrodes 3 in synchronism with changing-over between the anode electrodes 8 and 9 permits each one gate electrode 3 to control light emission or luminescence of each one of the anode electrodes 8 and each one of the anode electrodes 9.

The image display device of FIG. 3 permits the anode lead-out electrodes A1 and A2 of the anode electrodes 8 and 9 to be arranged without multi-level crossing of the electrodes A1 and A2. Also, the device permits arrangement of the gate electrodes and anode electrodes at a relationship of 1:2, to thereby substantially reduce a cost required for driving the gate electrodes.

In view of the fact known in the art, it is considered that electrons fed from the emitter array 12 to one of the anode electrodes 8 selected spread at an angle of about 30 degrees. This causes a part of the electrons to be fed to the anode electrodes adjacent to the anode electrode selected as indicated at dotted lines in FIG. 5, leading to leakage of luminescence, resulting in the image display device failing to exhibit a display with high definition.

The image display device shown in FIG. 4 is constructed so as to eliminate the problem. For this purpose, the device of FIG. 4 is so constructed that each one control electrode 14 is arranged between each adjacent two of the gate electrodes 3. A result of simulation of a current density distribution obtained due to arrangement of the control electrodes 14 between the gate electrodes 3 is indicated at B in FIG. 5. It will be noted from the result that arrangement of the control electrodes 14 restrains spreading of electrons.

Figure 6:
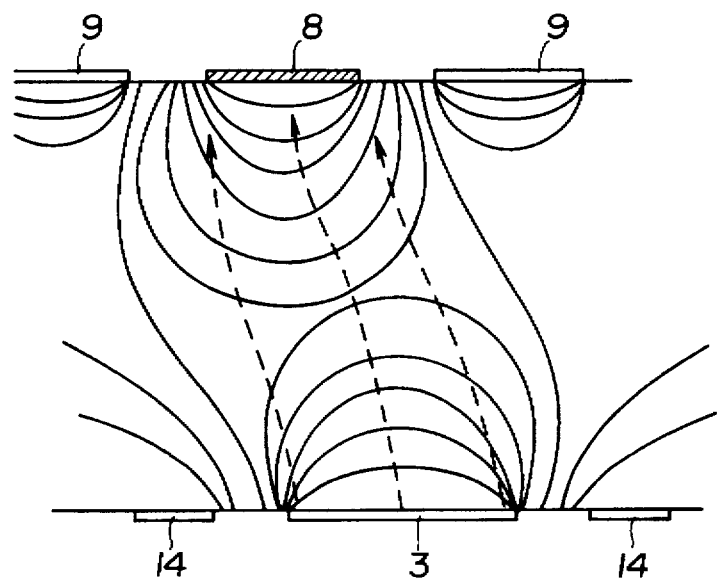
FIG. 6 is a diagrammatic view showing an electric filed distribution between cathode electrodes and anode electrodes.

A result of simulation of an electric field distribution concurrently obtained is shown in FIG. 6, which indicates that electrons field-emitted from the emitter array 12 are positively captured by only one anode electrode 8 without spreading, as indicated at broken lines. Thus, it will be noted that the image display device of FIG. 4 effectively prevents leakage luminescence. In the device of FIG. 4, the control electrodes 14 each have a negative voltage of a predetermined level constantly applied thereto.

In the image display device shown in each of FIGS. 2 to 4, the first and second substrates may be optimumly formed of glass. Alternatively, the first substrate may be conveniently formed of silicon, germanium or the like. The anode electrodes each may comprise a transparent electrode made of a suitable transparent conductive material.

Now, a drive device for driving the image display device of FIG. 3 will be described hereinafter with reference to FIG. 7 by way of example, which shows arrangement of the electrodes of the image display device which is viewed from a side of the anode electrodes of the image display device of FIG. 3.

Figure 7:
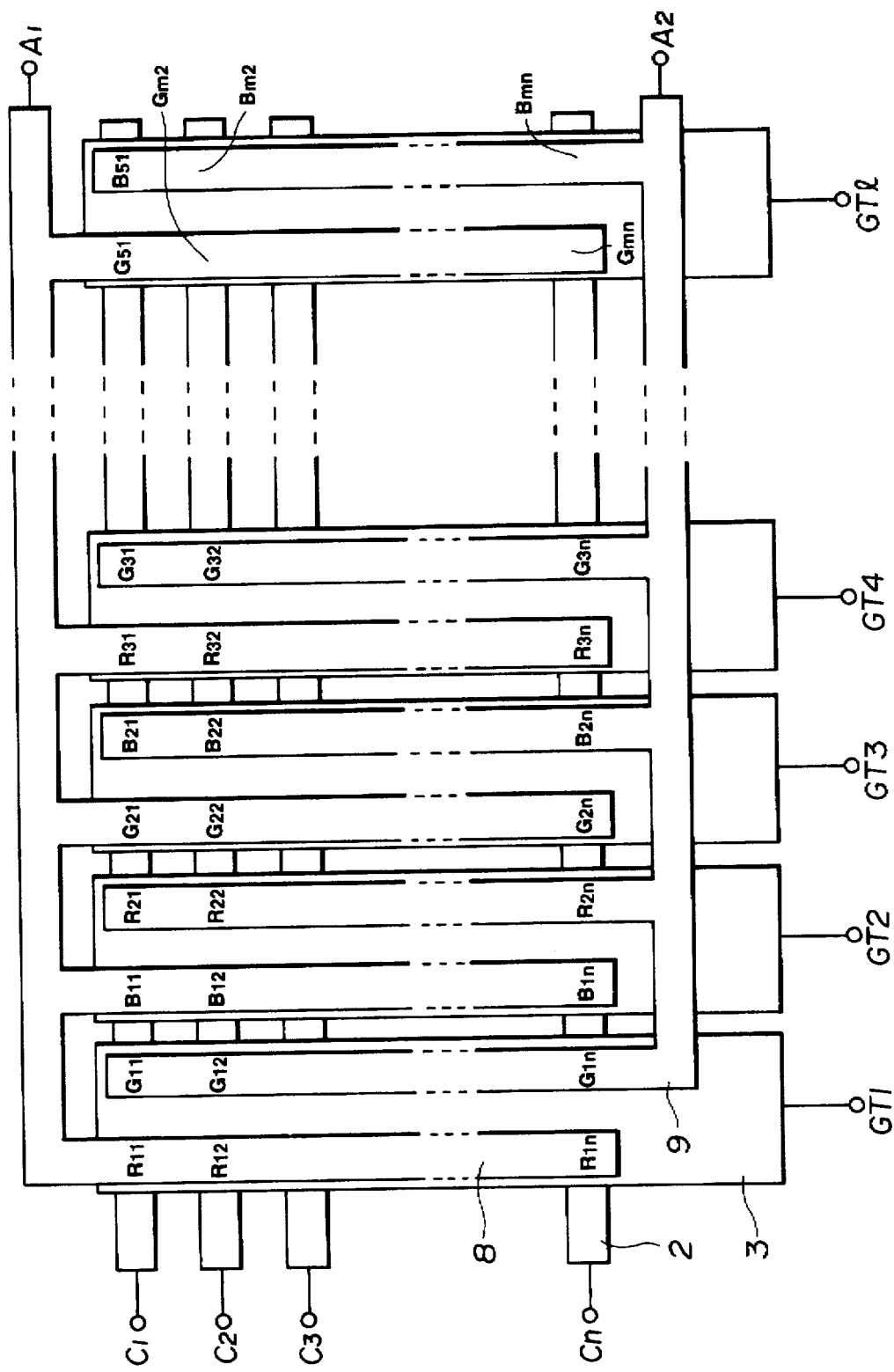
FIG. 7 is a schematic plan view showing arrangement of electrodes in the image display device of FIG. 3.

In FIG. 7, the anode lead-out electrodes A1 and A2 are led out of the anode electrodes 8 and 9 in the lump in a manner to opposite to each other, respectively. The gate electrodes 3 are arranged so as to be spaced from the anode electrodes 8 and 9 and parallel thereto. The gate electrodes 3 has gate lead-out electrodes GT1, GT2, - - -, GT1 connected thereto or led out thereof, respectively. The gate electrodes 3 each are arranged in a manner to straddle each of the anode electrodes 8 and each of the anode electrodes 9 so that each emitter array for field-emitting electrons is used common to each anode electrode 8 and each anode electrode 9.

Also, the cathode electrodes 2 are arranged below the gate electrodes 3 in a manner to be perpendicular to the anode electrodes 8 and 9 and the stripe-like cathode electrodes 2 have cathode lead-out electrodes C1, C2, - - -, Cn led out thereof, respectively. The cathode electrodes 2 each are provided thereon with the emitter arrays.

Further, the anode electrodes 8 and 9 alternately arranged in a repeated manner are depositedly formed thereon with phosphors R, G and B in turn in a repeated manner, so that the phosphors positioned at intersections between the anode electrodes 8 and 9 and the cathode electrodes 2 constitute picture cells, resulting in picture cells R11, G11 and B11; R21, G21 and B21; - - -; Rm2, Gm2 and Bm2 thus formed cooperating to each other to form first one line. Likewise, second one line is formed by picture cells R12, G12 and B12; - - -; Rm1, Rm2 and Bm1 and last one line is formed by R1n, G1n and B1n; - - -; Rmn, Gmn, Bmn.

Thus, the picture cells R11 to Bmn provided on the anode electrodes 8 and 9 are arranged in a matrix-like manner and selectively driven by means of the anode lead-out electrodes A1 and A2 and cathode lead-out electrodes C1 to Cn.

Selection of the picture cells of the image display device of FIG. 3 by the drive device constructed as described above is illustrated by way of example in each of FIGS. 10(a) to 10(d). Selection of picture cells shown in each of FIGS. 10(a) to 10(d) is carried out for an image for one frame by scanning the cathode lead-out electrode C1 to Cn while keeping a positive anode voltage applied to the anode lead-out electrode A1 and then scanning the cathode lead-out electrodes C1 to Cn while keeping the positive anode voltage applied to the anode lead-out electrode A2.

In FIGS. 10(a) to 10(d), R, G and B indicate the picture cells of FIG. 7 arranged in a matrix-like manner on the anode electrodes, of which suffixes are deleted for the sake of brevity. FIG. 10(a) shows a state that picture cells selected by applying a positive anode voltage to the anode lead-out electrode A1 and selecting the cathode lead-out electrode C1 are permitted to emit light. More particularly, in FIG. 10(a), phosphors R, B, G, - - - on a first line on which oblique lines are drawn are permitted to emit light. The reason why picture cells arranged at every second interval are thus permitted to emit light is that the anode lead-out electrode A1 is led out of the anode electrodes 8 alternated with the anode electrodes 9. Light-emission or luminescence of the picture cells thus selected is controlled depending on color data concurrently applied to the gate lead-out electrodes GT1 to GT1 of the gate electrodes 3.

FIG. 10(b) shows a state obtained at a timing subsequent to the state of FIG. 10(a). Application of the positive anode voltage to the anode lead-out electrode A1 is still kept, however, the cathode lead-out electrode C2 is selected in place of the electrode C1. This results in picture cells R, B, G - - - on a second line on which oblique lines are drawn in FIG. 10(b) being selected and permitted to emit light. In FIG. 10(b) as well as FIG. 10(a) described above, the picture cells arranged at every other interval are permitted to emit light and luminescence of the picture cells is controlled by color data concurrently applied to the gate lead-out electrodes GT1 to GTn.

Such driving is repeated, so that when the last cathode lead-out electrode Cn is subject to scanning, the image display device takes such a state as shown in FIG. 20(c). In FIG. 10(c), the positive anode voltage is applied to the anode lead-out electrode A2 and the cathode lead-out electrode C1 is selected, so that picture cells are selected and permitted to emit light.

In this state, picture cells G, R, B which correspond to the anode lead-out electrode A2 and are arranged at every other interval on the first line and on which oblique lines are drawn are permitted to emit light and luminescence of the picture cells is controlled by color data concurrently applied to the gate lead-out electrodes GT1 to GTn. This results in control of light emission or luminescence of all picture cells on the first line being completed.

Then, a state shown in FIG. 10(d) is obtained. In this state, the positive anode voltage is kept applied to the anode lead-out electrode A2 of the anode electrodes 9, however, the cathode lead-out electrode C2 is selected in place of the cathode lead-out electrode C1, resulting in picture cells being selected and permitted to emit light. More particularly, picture cells G, R, B, - - - on the second line are permitted to emit light and luminescence of the picture cells being controlled by color data concurrently applied to the gate lead-out electrodes GT1 to GTn.

Thus, the cathode lead-out electrodes C1 to Cn are scanned in turn while the positive anode voltage is kept applied to the anode lead-out electrode A2, so that when the last cathode Cn is scanned, all picture cells of the display device are permitted to emit light and luminescence of the picture cells is controlled, resulting in an image for one frame being displayed on the display device.

The drive device for carrying out the driving and controlling described above will be more detailedly described with reference to FIGS. 8 and 9(a) to 9(k), 9(m), 9(n), and 9(p).

Figure 8:
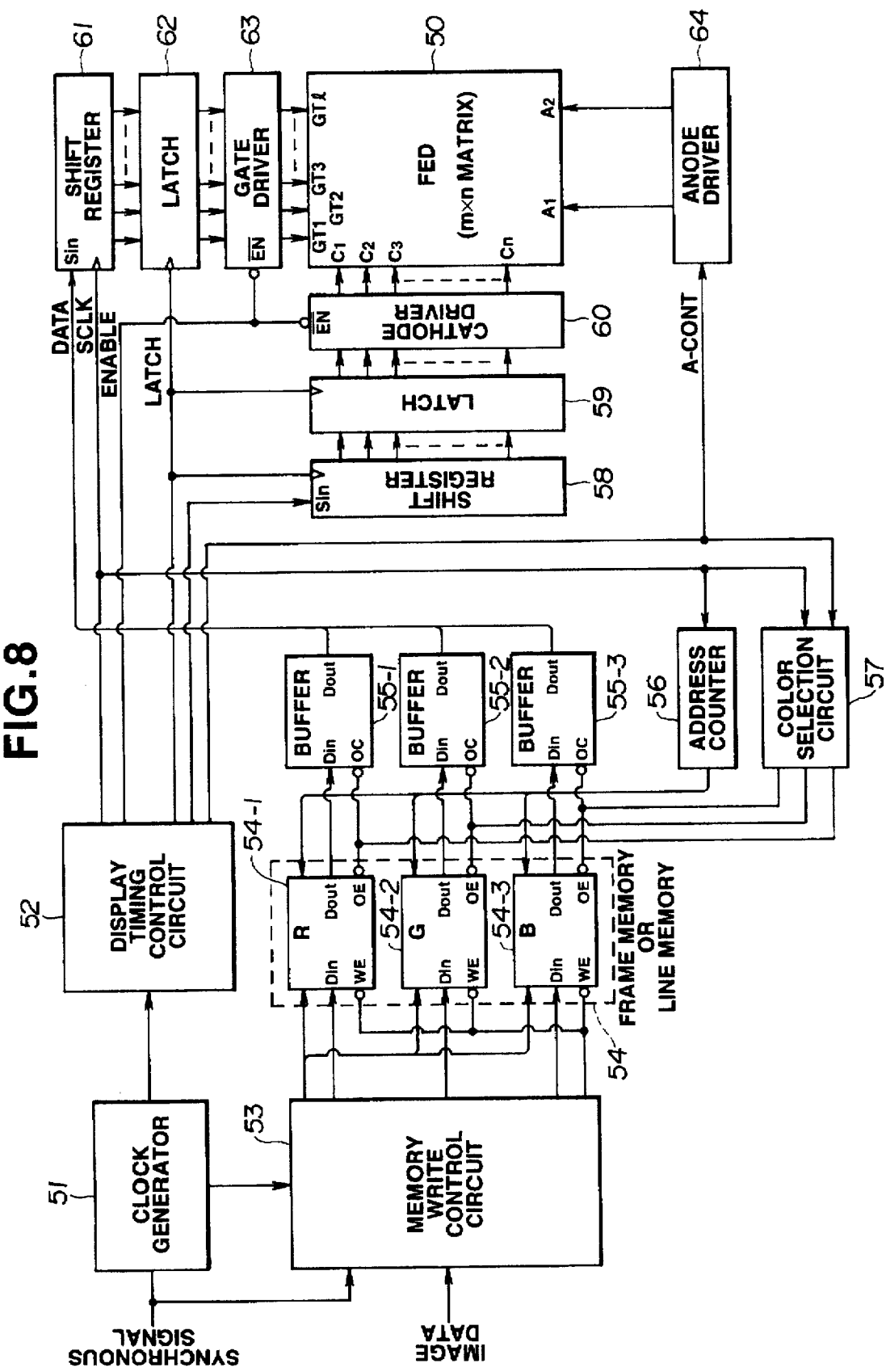
FIG. 8 is a block diagram showing an embodiment of a drive device for an image display device according to the present invention.

In FIG. 8, reference numeral 50 designates an image display device (FED) which includes field emission cathodes including picture cells of m×n in number arranged in a matrix-like manner, 51 is a clock generator for generating a clock in synchronism with a synchronous signal applied thereto, 52 is a display timing control circuit for controlling a display timing by means of the clock generated by the clock generator 51, 53 is a memory write control circuit for controlling writing of a video memory 54 which includes frame memories or line memories 54-1, 54-2 and 54-3 for storing data on R, G and B images therein, 55-1 to 55-3 are buffer registers for holding therein data on luminous colors R, G and B read out from the video memory 54.

Reference numeral 56 designates an address counter for generating addresses for the video memories 54, 57 is a color section circuit, 58 is a shift register for shifting data for controlling the cathode electrodes, 59 is a latch circuit for latching data of the shift register 58, 60 is a cathode driver for driving the cathode electrodes by means of data of the latch circuit 59, 61 is a shift register for shifting color data fed from the buffer registers 55-1 to 55-3 by means of a shift clock, 62 is a latch circuit for latching data of the shift register 61, and 63 is a gate driver for driving the gate electrodes by means of an output of the latch circuit 62.

FIG. 9(a) shows an output pulse of an anode driver for driving the anode lead-out electrode A1, FIG. 9(b) shows an output pulse of the anode driver 64 for driving the anode lead-out electrode A2, FIG. 9(c) shows an output pulse of the cathode driver 60 for driving the cathode lead-out electrode C1, FIG. 9(d) shows an output pulse of the cathode driver 60 for driving the cathode lead-out electrode C2, FIG. 9(e) shows an output pulse of the cathode driver 60 for driving the cathode lead-out electrode C3, and FIG. 9(f) shows an output pulse of the cathode driver 60 for driving the cathode lead-out electrode Cn.

Also, FIG. 9(g) shows color data applied from the gate driver 63 to the gate lead-out electrode GT1, FIG. 9(h) shows color data applied from the gate driver 63 to the gate lead-out electrode GT2, FIG. 9(i) shows color data applied from the gate driver 63 to the gate lead-out electrode GT3, FIG. 9(j) shows color data applied from the gate driver 63 to the gate lead-out electrode GT1, FIG. 9(k) shows an enable signal for controlling operation of the cathode driver 60, FIG. 9(m) shows a latch pulse indicating a latch timing of each of the latch circuits 59 and 62, FIG. 9(n) shows a shift clock fed to the shift register 61, and FIG. 9(p) shows color data fed from the gate driver 63 to the gate lead-out electrodes GT1 to GTn of the gate electrode.

Now, the manner of operation of the drive device for the image display device 50 constructed as described above will be described with reference to FIGS. 9(a) to 9(k), 9(m), 9(n) and 9(p).

Image data are fed to the memory write control circuit 53, in which a write timing of the image data is subject to control. Also, the color data are stored for every color in synchronism with a clock generated by the clock generator in the video memory 54. The memories 54-1 to 54-3 of the video memory 54 have color data on the colors R, G and B stored therein respectively. The color data thus stored in the memories are read therefrom depending on the addresses of the address counter 56 while being subject to control by the color section circuit 57 and then held in the buffer registers 55-1 to 55-3.

The buffer registers 55-1, 55-2 and 55-3 are subject at an output timing thereof to control by the color selection circuit 57, so that the color data held therein are fed in the same order as the picture cells R, G and B shown in FIG. 10 to the shift register circuit 61. The shift register 61 shifts the color data by means of the shift clock SCLK shown in FIG. 9(n).

Of the picture cells on the first line of the image display device 50, color data of half picture cells corresponding in number to the stripe-like anode electrodes connected to the anode lead-out electrode A1 are fed to the shift register 61, which then shifts color data on the picture cells. Then, the color data are latched by the latch pulse shown in FIG. 9(m) in the latch circuit 62. Output data of the latch circuit 62 are applied to the gate driver 63.

The display control timing circuit 52 controls the anode driver 64, to thereby cause the anode driver 64 to apply a positive anode voltage to only the anode lead-lead electrode A1 as shown in FIG. 9(b). Also, the display control timing circuit 52 feeds the shift register 58 with the latch pulse shown in FIG. 9(m) as a shift pulse, resulting in a scan signal output from the control circuit 52 being shifted. An output of the shift register 58 is latched by the above-described latch pulse in the latch circuit 59, so that the latch circuit 59 outputs the scan signal shifted at every latch pulse. The scan signal shifted is then fed to the cathode driver 60.

This results in output pulses being fed from the cathode driver 60 to the cathode lead-out electrodes C1, C2, C3, - - -, Cn of the image display device 50 in turn as shown in FIGS. 9(c), 9(d), 9(e) and 9(f), so that the cathode lead-out electrodes C1, C2, C3, - - -, Cn each are scanned at a timing of the latch pulse described above.

At this time, color data shown in FIG. 9(g), 9(h), 9(i) and 9(j) are fed from the gate driver 63 to the gate lead-out electrodes GT1 to GT1 in synchronism with scanning of the cathode lead-out electrodes C1 to Cn, so that color data on the colors R, B, G, - - -, G shown in FIG. 10(a) are fed to the gate lead-out electrodes GT1 to GT1 while the cathode lead-out electrode C1 is kept driven as shown in FIG. 9(c).

Thus, half of the picture cells on the first line of the image display device 50 are subject to luminous control as shown in FIG. 10(a). Then, the cathode lead-out electrode C2 is selected at a timing of the next latch pulse. At this time, the next color data have been shifted to the shift register 61 by means of the shift clock SCLK, so that the image display device 50 controls luminescence or light emission of half of the picture cells on the second line as shown in FIG. 10(b).

Such scanning as described above is successively carried out, so that scanning of the last cathode lead-out electrode C2 leads to control of luminescence of half of the picture cells for one frame. Then, the display timing control circuit 52 controls the anode driver 64, resulting in the anode driver 64 applying a positive anode electrode to the anode lead-out electrode A2.

Then, scanning of the cathode lead-out electrodes C1 to Cn in the same manner as described above causes the remaining half of the picture cells for one frame to be subject luminous control as shown in FIG. 10(c) and 10(d), so that scanning of the last cathode lead-out electrode Cn results in an image for one frame being displayed on the image display device 50.

Thus, the drive device for the image display device 50 permits the number of times of changing-over between the anode lead-out electrodes for every one frame to be only two, so that a drive circuit for the anode lead-out electrodes may be simplified in construction. Also, biasing of the anode electrodes which are not selected to a negative voltage more effectively prevents color mixing.

Now, another embodiment of the drive device for the image display device 50 will be described hereinafter with reference to FIGS. 11 to 13(d).

A drive device of the embodiment is adapted to carry out selection of the anode lead-out electrode A1 and application of a positive anode voltage to the anode lead-out electrode A1 and then carry out selection of the anode lead-out electrode A2 and application of the positive anode voltage to the anode lead-out electrode A2 while keeping the cathode lead-out electrode C1 selected. Then, the cathode lead-out electrode C2 is selected in place of the cathode lead-out electrode C1. Also, the anode lead-out electrode electrode A1 is selected and then the anode lead-out electrode A2 is selected at the next timing while the cathode lead-out electrode C2 is kept selected. This results in an image for one frame being obtained on the image display device at the time when selection of the last cathode lead-out electrode Cn is completed.

Now, the manner of operation of the drive device will be described with reference to FIGS. 13(a) to 13(d).

In FIG. 13(a) to 13(d), R, G and B designate the picture cells of FIG. 7 arranged in a matrix-like manner on each of the anode electrodes, of which suffixes are deleted for the sake of brevity. FIG. 13(a) shows a state that picture cells selected by applying a positive anode voltage to the anode lead-out electrode A1 selected and selecting the cathode lead-out electrode C1 are permitted to emit light. More particularly, in FIG. 13(a), half of phosphors R, B, G, - - - on a first line which correspond to the anode lead-out electrode A1 and on which oblique lines are drawn are permitted to emit light. The reason why the picture cells arranged at every other or second interval are thus permitted to emit light is that the anode electrodes 8 connected to the anode lead-out electrode A1 are arranged at every second interval or alternated with the anode electrodes 9. Light-emission or luminescence of the picture cells thus selected is controlled depending on color data concurrently applied to the gate lead-out electrodes GT1 to GT1 of the gate electrodes 3.

FIG. 13(b) shows a state obtained at a timing subsequent to the state of FIG. 13(a). In the state shown in FIG. 13(b), the anode lead-out electrode A2 is selected and applied thereto a positive anode voltage while the cathode lead-out electrode C1 is kept selected. Picture cells thus selected are shown in FIG. 13(b). More particularly, picture cells R, B, G, - - - arranged at every other interval on the first line on which oblique lines are drawn are permitted to emit light. Luminescence of the picture cells thus permitted to emit light is controlled by color data concurrently applied to the gate lead-out electrodes GT1 to GTn, so that all the picture cells on the first line is subject to luminous control.

Then, the cathode lead-out electrode C2 is selected at the next timing and the anode lead-out electrode A1 is selected, followed by application of a positive anode voltage to the anode lead-out electrode A1. FIG. 13(c) shows picture cells thus selected. More particularly, half R, B, G, - - - of picture cells on a second line which are arranged at every other interval and on which oblique lines are drawn are permitted to emit light and luminescence of the picture cells selected is controlled by color data concurrently applied to the gate lead-out electrodes GT1 to GTn.

Then, a state shown in FIG. 13(d) is obtained at the next timing, in which a positive anode voltage is applied to the anode lead-out electrode A2 while the cathode lead-out electrode C2 is kept selected. This results in the remaining picture cells G, R, B, - - - on the second line being permitted to emit light and luminescence of the picture cells being controlled by color data concurrently applied to the gate lead-out electrode GT1 to GTn of the gate electrodes 3.

Thus, the anode lead-out electrodes A1 and A2 are selected in turn while the cathode lead-out electrodes C1 to Cn are scanned in turn, so that scanning of the last cathode lead-out electrode Cn results in all the picture cells being permitted to emit light and luminescence thereof being controlled. Thus, an image for one frame is displayed on the image display device.

Construction of the drive device which drives and controls the image display device as described above will be described with reference to FIG. 11 and 12(a) to 12(k), 12(m), 12(n) and 12(p).

Figure 11:
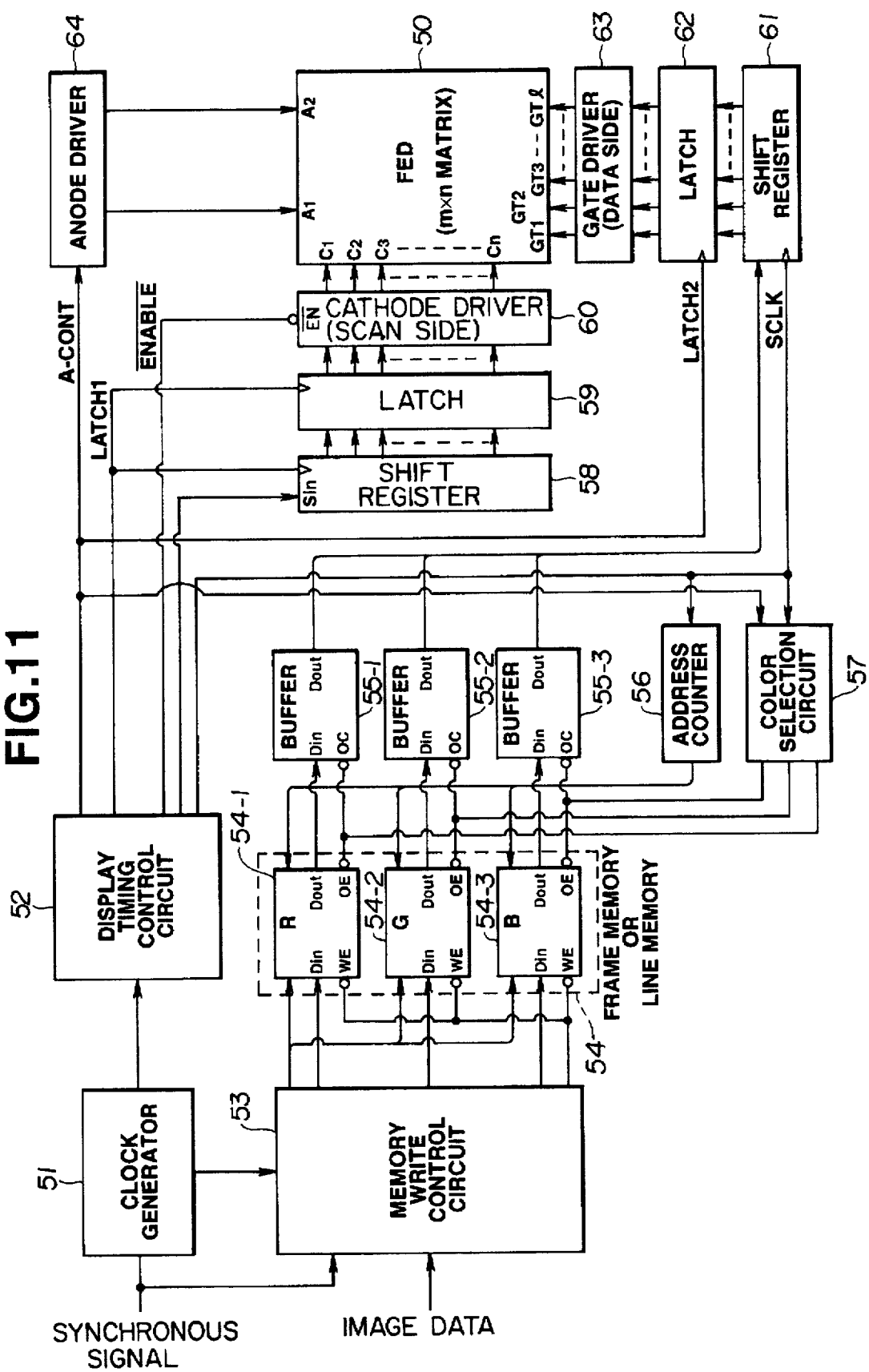
FIG. 11 is a block diagram showing another embodiment of a drive device for an image display device according to the present invention.

In FIG. 11, reference numeral 50 designates the image display device (FED) constructed as described above which is driven and controlled by the drive device. The image display device, as described above, includes the field emission cathodes including the picture cells of m×n in number arranged in a matrix-like manner. In the device shown in FIG. 11, reference numeral 51 is a clock generator for generating a clock in synchronism with a synchronous signal applied thereto, 52 is a display timing control circuit for controlling a display timing by means of the clock generated by the clock generator 51, 53 is a memory write control circuit for controlling writing of a video memory 54 which includes frame memories or line memories 54-1, 54-2 and 54-3 for storing data on R, G and B images therein, 55-1 to 55-3 are buffer registers for holding therein data on luminous colors R, G and B read out from the video memory 54.

Reference numeral 56 designates an address counter for generating addresses for the video memories 54, 57 is a color section circuit, 58 is a shift register for shifting data for scanning and controlling the cathode electrodes, 59 is a latch circuit for latching data of the shift register 58, 60 is a cathode driver for driving the cathode electrodes by means of data of the latch circuit 59, 61 is a shift register for shifting color data fed from the buffer registers 55-1 to 55-3 by means of a shift clock SCLK, 62 is a latch circuit for latching data of the shift register 61, and 63 is a gate driver for driving the gate electrodes by means of an output of the latch circuit 62.

FIG. 12(a) shows a drive pulse of an anode driver 64 for driving the anode lead-out electrode A1, FIG. 12(b) shows a drive pulse of the anode driver 64 for driving the anode lead-out electrode A2, FIG. 12(c) shows a drive pulse of the cathode driver 60 for driving the cathode lead-out electrode C1, FIG. 12(d) shows a drive pulse of the cathode driver 60 for driving the cathode lead-out electrode C2, FIG. 12(e) shows a drive pulse of the cathode driver 60 for driving the cathode lead-out electrode C3, and FIG. 12(f) shows a drive pulse of the cathode driver 60 for driving the cathode lead-out electrode Cn.

FIG. 12(g) shows color data applied from the gate driver 63 to the gate lead-out electrode GT1, FIG. 12(h) shows color data applied from the gate driver 63 to the gate lead-out electrode GT2, FIG. 12(i) shows color data applied from the gate driver 63 to the gate lead-out electrode GT3, FIG. 12(j) shows color data applied from the gate driver 63 to the gate lead-out electrode GT1. FIG. 12(k) shows an enable signal for controlling operation of the cathode driver 60. FIG. 12(m) shows a latch pulse for controlling the anode driver 64 which indicates a latch timing of the latch circuit 62. FIG. 12(n) shows a shift clock fed to the shift register 61. and FIG. 12(p) shows color data fed from the gate driver 63 to the gate lead-out electrodes GT1 to GTn of the gate electrode 3.

Now, the manner of operation of the drive device for the image display device 50 constructed as described above will be described with reference to FIGS. 12(a) to 12(k), 12(m), 12(n) and 12(p).

Image data are fed to the memory write control circuit 53, in which a write timing of the image data is subject to control. Also, the color data are stored for every color in synchronism with a clock generated by the clock generator in the video memory 54. The memories 54-1 to 54-3 of the video memory 54 have color data on the colors R, G and B stored therein respectively. The color data thus stored in the memories are read therefrom depending on the addresses of the address counter 556 while being subject to the color section circuit 57 and then held in the buffer registers 55-1 to 55-3.

The buffer registers 55-1, 55-2 and 55-3 are subject at an output timing thereof to control by the color selection circuit 57, so that the color data held therein are fed in the same order as the picture cells R, G and B shown in FIG. 10 to the shift register circuit 61. The shift register 61 shifts the color data by means of the shift clock SCLK shown in FIG. 12(n).

Of the picture cells on the first line of the image display device 50, half corresponding in number to the stripe-like anode electrodes connected to the anode lead-out electrode A1 are fed to the shift register 61, which then shifts color data on the picture cells. Then, the color data are latched by the latch pulse shown in FIG. 12(m) in the latch circuit 62. Output data of the latch circuit 62 are applied to the gate driver 63.

The display control timing circuit 52 applies the above-described latch pulse to the anode driver 64, to thereby alternately change over the anode lead-out electrode A1 and A2 in synchronism with the latch pulse as shown in FIG. 12(a) and 12(b), resulting in applying a positive anode voltage to the anode lead-out electrode selected.

Also, the display control timing circuit 52 feed the shift register 58 with a latch pulse of a cycle twice as long as that of the latch pulse shown in FIG. 12(m) as a shift pulse, resulting in a scan signal output from the control circuit 52 being shifted. An output of the shift register 58 is latched by the above-described latch pulse of the double cycle in the latch circuit 59, so that the latch circuit 59 outputs the scan signal shifted at every latch pulse. The scan signal shifted is then fed to the cathode driver 60.

This results in output pulses being fed from the cathode driver 60 to the cathode lead-out electrodes C1, C2, C3, - - -, Cn of the image display device 50 in turn as shown in FIGS. 12(c), 12(d), 12(e) and 12(f), so that changing-over between the anode lead-out electrode A1 and the anode lead-out electrode A2 is carried out for selection while the cathode lead-out electrodes C1, C2, C3, - - -, Cn each are selected in turn.

Concurrently, color data shown in FIG. 12(g), 12(h), 12(i) and 12(j) are fed from the gate driver 63 to the gate lead-out electrodes GT1 to GT1 in synchronism with changing-over between the anode lead-out electrodes, so that color data on the colors R, B, G, - - -, G shown in FIG. 13(a) are fed to the gate lead-out electrodes GT1 to GT1 while the anode lead-out electrode A1 is kept driven as shown in FIG. 12(a).

Thus, half of the picture cells on the first line of the image display device 50 on which oblique lines are drawn is subject to luminous control as shown in FIG. 13(a). Then, the anode lead-out electrode A2 is selected at a timing of the next latch pulse. At this time, the next color data have been shifted to the shift register 61 by means of the shift clock SCLK, so that the image display device 50 controls luminescence or light emission of the remaining picture cells on the first line on which oblique lines are drawn in FIG. 13(b).

Then, scanning is carried out while keeping the cathode lead-out C2 selected and carrying out changing-over between the the anode lead-out electrodes, so that picture cells on a second line being subject to luminous control as shown in FIGS. 13(c) and 13(d).

Such operation is successively repeated; so that when scanning of the last cathode lead-out electrode is carried out, picture cells on all lines are subject to luminous control, resulting in an image for one frame being displayed on the image display device.

The picture cells on the image display device may be scanned in a zigzag manner depending on a manner of scanning of the anode lead-out electrodes and cathode lead-out electrodes. Also, the embodiments described above each have the phosphors of red, blue and green luminous colors incorporated therein. Alternatively, the present invention may be constructed in such a manner that one kind of a phosphor having an increased luminous wavelength range and filters different in transmission wavelength characteristics are arranged, to thereby obtain a plurality of luminous colors such as red, blue, green and the like through the filters.

Figure 14:
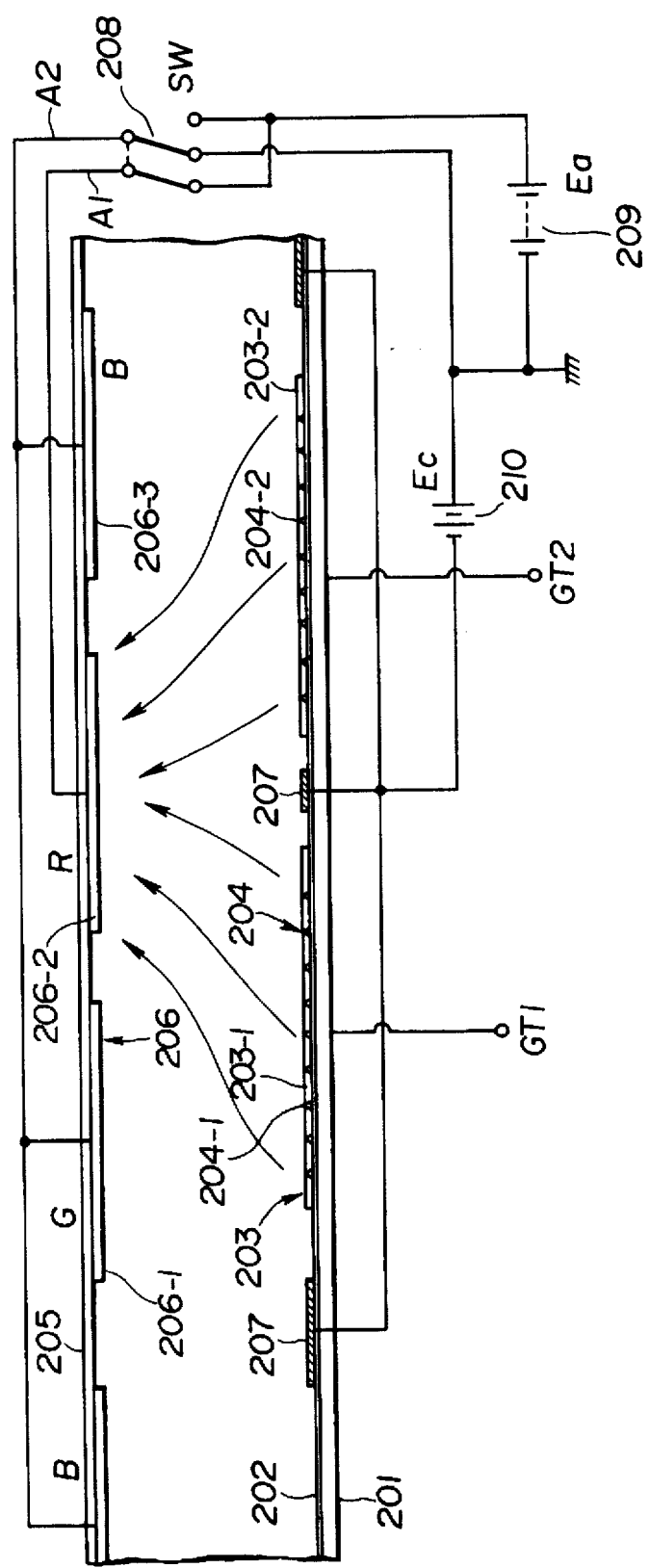

Now, a further embodiment of an image display device according to the present invention in which arrangement of anode electrodes which are expected to be decreased in luminance and arrangement of emitter arrays are specified will be described hereinafter with reference to FIGS. 14 and 15. The embodiment is adapted to obtain red, blue and green luminous colors by phosphors themselves without using any filter. In FIGS. 14 and 15, reference numeral 201 designates a first substrate made of a material such as glass or the like on which FED arrays are arranged, 202 are cathode electrodes formed on the first substrate 201, 203 is a gate electrode means including a plurality of stripe-like gate electrodes 203-1, 203-2 - - - formed through an insulating film such as a SiO$_2$ film or the like on each of the cathode electrodes 202, and 204 is an emitter means including emitter arrays 204-1, 204-2 - - - for field-emitting electrons which are formed on each of the cathode electrodes 202 in a manner to positionally correspond to the gate electrodes 203-1, 203-2 - - - .

Reference numeral 205 designates a second substrate made of glass or the like and arranged so as to be spaced at a predetermined distance from the first substrate 201, and 206 is an anode electrode means including a plurality of anode electrodes 206-1, 206-2 and 206-3, which are formed of transparent conductive material. The anode electrodes 206-1, 206-2 and 206-3 are formed thereon with phosphors of a green luminous color, a red luminous color and a blue luminous color, respectively. Reference numeral 207 designates control electrodes arranged between the gate electrodes 203 for restraining spreading of electrodes.

In view of the fact that a current technical level fails to permit a phosphor of a red luminous color to exhibit luminous efficiency of a level equal to that of phosphors of the other luminous colors, the phosphor of a red luminous color is arranged on the anode electrode 206-2.

Also, reference numeral 208 designates a switch (SW) for selectively scanning the anode lead-out electrodes A1 and A2 of the anode electrode means 206, 209 is an anode voltage (Ea) applied to the anode electrodes selected, 210 is a negative voltage (Ec) applied to the control electrodes 207, A1 is an anode lead-out electrode to which the anode electrode 206-2 having the phosphor of a red luminous color deposited thereon is connected, A2 is an anode lead-out electrode to which the anode electrodes 206-1 and 206-2 having the phosphors of blue and red luminous colors deposited thereon are connected, and GT1 and GT2 are gate lead-out electrodes led out of the gate electrodes 203-1 and 203-2, respectively. The FEC arrays each are constituted by the cathode electrodes 202, gate electrodes 203 and emitters 204.

As shown in FIGS. 14 and 15, the gate electrodes 203-1 and 203-2 are positioned below the anode electrode 206-2, the gate electrode 203 is positioned below the anode electrode 206-1, and the gate electrode 203-2 is located below the anode electrode 206-3.

Then, when the switch 208 is changed over as shown in FIG. 14, the anode voltage 209 is applied to the anode lead-out electrode A1, resulting in being applied to the anode electrode 206-2 provided thereon with the phosphor of a red luminous color. This causes electrons emitted from the emitter arrays 204-1 and 204-2 to be captured by the anode electrode 206-2 as shown in FIG. 14, so that the phosphor of a red luminous color deposited on the anode electrode 206-2 may be excited for light emission or luminescence. Concurrently, color data are applied to the gate lead-out electrodes GT1 and GT2, to thereby control the gate electrodes 203-1 and 203-2.

Subsequently, the switch 208 is changed over as shown in FIG. 15, the anode electrode 209 is then applied to the anode lead-out electrode A2, to thereby be applied to the anode electrode 206-1 having the phosphor of a green luminous color deposited thereon and the anode electrode 206-3 including the phosphor of a blue luminous color. This causes electrons emitted from the emitter array 204-1 to be captured by the anode electrode 206-1 and electrons emitted from the emitter array 204-2 to be captured by the anode electrode 206-3, so that the phosphors of green and blue luminous colors deposited on the anode electrodes may be excited for luminescence. Concurrently, color data on a green luminous color are applied to the gate lead-out electrode GT1 and those on a blue luminous color are applied to the gate lead-out electrode GT2, so that the gate electrodes 203-1 and 203-2 are controlled.

In view of the fact that such an FEC as shown in FIG. 13 causes electrons to be emitted from an emitter of a conical shape while spreading at an angle of about 30 degrees, it would be considered that the image display device shown in FIG. 14 has a possibility that electrons emitted from the emitter arrays 204-1 and 204-2 are partially captured by the anode electrodes 206-3 and 206-1, respectively, as indicated at broken lines in FIG. 15.

Figure 16A:
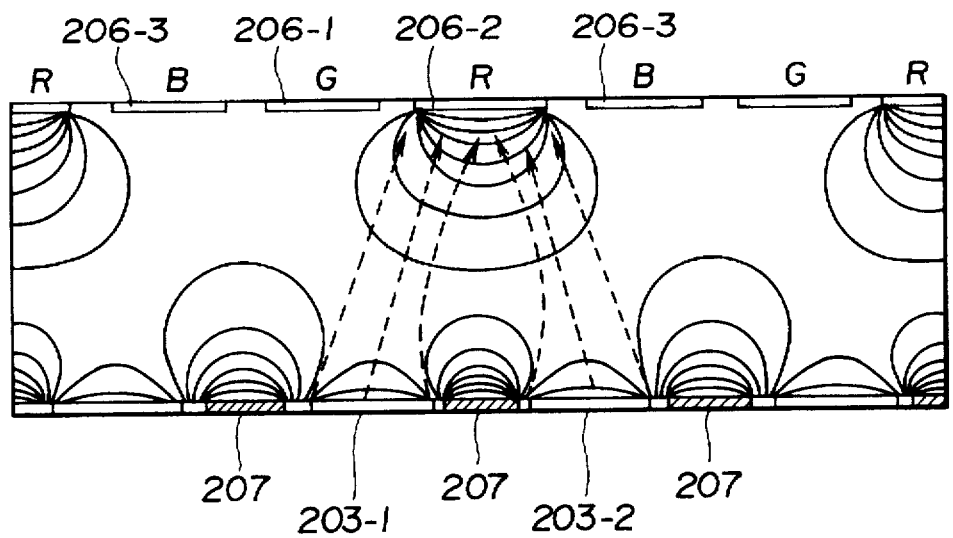
FIGS. 16(a) and 16(b) each are a diagrammatic view showing an electric field distribution.
Figure 16B:
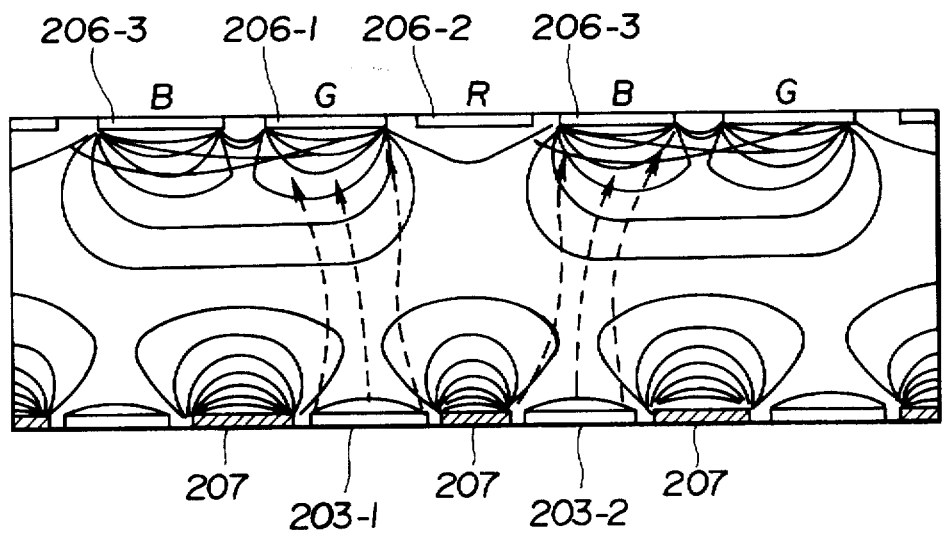

In order to eliminate the problem, the control electrode 207 is arranged between each adjacent two of the gate electrodes 203 and the negative control voltage Ec is applied thereto. An electric field distribution obtained due to application of the negative voltage Ec to the control electrodes 207 is shown in each of FIGS. 16(a) and 16(b). More particularly, FIG. 16(a) shows an electric field distribution obtained by the device shown in FIG. 14 and FIG. 16(b) shows that by the device of FIG. 15. When the anode electrode 206-2 is selected and the anode voltage Ea is applied thereto as shown in FIG. 14, electrons emitted from portions of the emitter arrays 204-1 and 204-2 at which the gate electrodes 203-1 and 203-2 are arranged are deflected toward the anode electrode 206-2 by the electric field shown in FIG. 16(a). When the anode electrodes 206-1 and 206-3 are selected and the anode voltage Ea is applied thereto as shown in FIG. 15, the electric field shown in FIG. 16(b) causes electrons emitted from a portion of the emitter array at which the gate electrode 203-1 is arranged to be deflected toward the anode electrode 206-1 and those emitted from a portion of the emitter array 204-2 at which the gate electrode 203-2 is arranged to be deflected toward the anode electrode 206-3.

Concurrently, the negative control voltage Ec is kept applied to the control electrodes 207, which voltage generates an electric field which permits electrons emitted from the emitter arrays to be attracted by the corresponding anode electrodes while preventing the electrons from being attracted by the adjacent anode electrodes as broken lines in FIG. 15.

Figure 17:
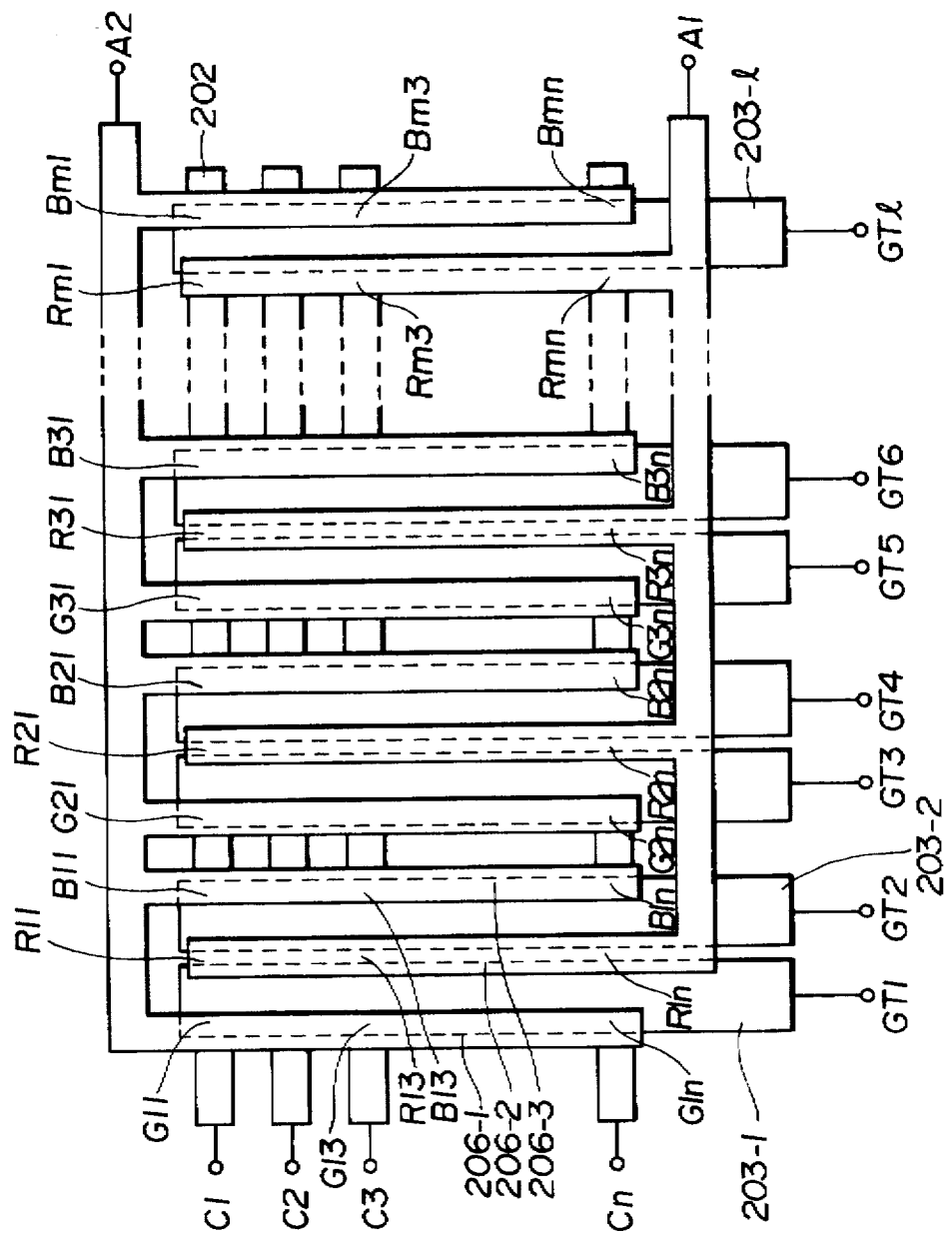
FIG. 17 is a schematic plan view showing arrangement of electrodes in the image display device of each of FIG. 14 and 15.
Figure 22:
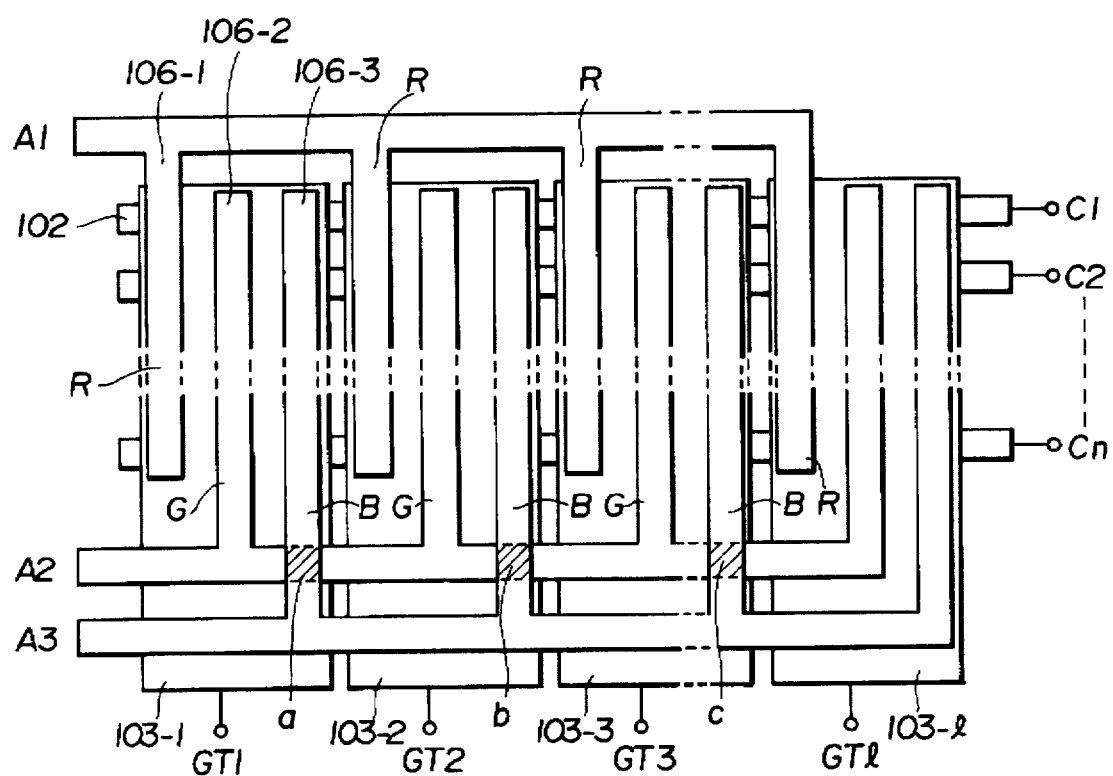
FIG. 22 is a schematic plan view showing an anode electrodes in a conventional image display device.
Figure 23:
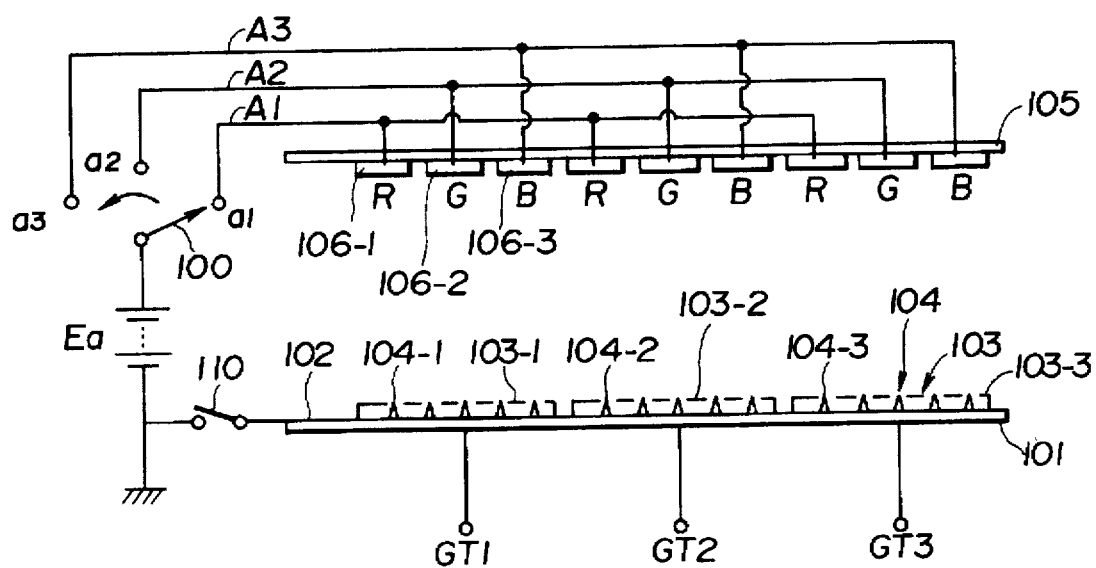
FIG. 23 is sectional view showing a conventional image display device.

FIG. 17 shows arrangement of the electrodes of each of the image display devices shown in FIGS. 14 and 15 which is viewed from a side of the anode electrodes, wherein the control electrodes are omitted for the sake of brevity. In FIG. 17, the anode electrode 206-2 is connected to the anode lead-out electrode A1 led out of one side and the anode electrodes 206-1 and 206-3 are connected to the anode lead-out electrode A2 led out of the other or opposite side. The gate electrodes 203-1, 203-2, - - - , 203-1 are arranged in a manner to be spaced from the anode electrodes 206-1 to 206-3 and parallel thereto and the gate lead-out electrodes GT1, GT2, - - - , GT1 are led out of the gate electrodes 203-1 to 203-1, respectively. The gate electrode 203-1 is arranged so as to straddle or extend over the anode electrodes 206-1 and 206-2 and the gate electrode 203-2 is arranged so as to straddle the anode electrode 206-2 and 206-3.

Also, the cathode electrodes 202 are arranged below the gate electrodes 203-1 to 203-1 so as to be perpendicular to the anode electrodes 206-1 to 206-3 and the cathode lead-out electrodes C1, C2, - - - , Cn are led out of the stripe-like cathode electrodes 202, respectively. The emitter arrays are formed on the cathode electrodes 202. The anode electrodes 206-1 to 206-3 are depositedly formed thereon with the phosphor layers of green, red and blue luminous colors in turn and in a repeated manner, so that the phosphors positioned at intersections between the anode electrodes 206-1 to 206-3 and the cathode electrodes 202 define picture cells G11, R11, B11, G21, R21, B21, - - - , Gm1, Rm1, Bm1 on a first horizontal line, picture cells G12, R12, B12, - - - , Gm2, Rm2, Bm2 on a second horizontal line, - - - , picture cells G1n, R1n, B1n, - - - , Gmn, Rmn, Bmn on the last horizontal line.

Thus, the picture cells G11 to Bmn are arranged in a matrix-like manner and selectively driven by the anode lead-out electrodes A1 and A2 and cathode lead-out electrodes C1 to Cn.

Now, an image display drive circuit for the image display device of which the electrodes are arranged as shown in FIG. 17 will be exemplified hereinafter. The circuit may be constructed in substantially the same manner as that shown in FIG. 11 but is somewhat different therefrom in timing as shown in FIG. 18.

The drive circuit is so constructed that selection of the anode lead-out electrode A1 and application of the positive anode voltage Ea to the anode electrode 206-2 are carried out while keeping the cathode lead-out electrode C1 selected and then selection of the anode lead-out electrode A2 and application of the positive anode voltage to the anode electrodes 206-1 and 206-3 are carried out at the next timing. Then, the anode lead-out electrode A1 is selected while keeping the cathode lead-out electrode C2 selected in place of the cathode lead-out electrode C1 and then the anode lead-out electrode A2 is selected at the next timing. Such operation is repeated successively, so that completion of selection of the last cathode lead-out electrode Cn results in an image for one frame being obtained on the image display device.

Now, the manner of operation of the drive circuit will be described hereinafter with reference to FIGS. 19(a) to 19(d).

In FIG. 19(a) to 19(d), R, G and B designate the picture cells of FIG. 17 arranged in a matrix-like manner on each of the anode electrodes 206-1, 206-2 and 206-3, of which suffixes are deleted for the sake of brevity. FIG. 19(a) shows a state that picture cells selected by applying a positive anode voltage to the anode electrode 206-2 selected and selecting the cathode lead-out electrode C1 are permitted to emit light. More particularly, in FIG. 19(a), phosphors of a red luminous color or phosphors R on a first line which are deposited on the anode electrode 206-2 and on which oblique lines are drawn are permitted to emit light. The reason why the picture cells or phosphors R arranged at every third intervals are thus permitted to emit light is that the anode electrodes 206-2 connected to the anode lead-out electrode A1 are arranged at every third intervals. Light-emission or luminescence of the phosphors R thus selected is controlled depending on color data on a red luminous color concurrently applied to the gate lead-out electrodes GT1 to GT1.

FIG. 19(b) shows a state obtained at a timing subsequent to the state of FIG. 19(a). In the state shown in FIG. 19(b), the anode lead-out electrode A2 is selected and a positive anode voltage is applied to the anode electrodes 206-1 and 206-3 while the cathode lead-out electrode C1 is kept selected. Picture cells thus selected are permitted to emit light. More particularly, the remaining phosphors G, B, G, B, --- on the first line on which oblique lines are drawn are permitted to emit light. Concurrently, light emission of the first phosphor G on the first line which is permitted to emit light is controlled by color data on green concurrently applied to the gate lead-out electrode GT1 and that of the phosphor B next but one is controlled by color data on blue applied to the gate lead-out electrode GT2. This results in light emission of all picture cells on the first line being controlled.

Then, at the next timing, the cathode lead-out electrode C2 is selected and the anode lead-out electrode A1 is selected, followed by application of the positive anode voltage Ea to the anode electrode 206-2, resulting in picture cells shown in FIG. 19(c) being selected. More particularly, phosphors R on a second line on which oblique lines are drawn are permitted to emit light and luminescence of the phosphors R selected is controlled by color data on red concurrently applied to the gate lead-out electrodes GT1 to GT1.

Subsequently, a state shown in FIG. 19(d) is obtained at the next timing, in which the positive anode voltage Ea is applied to the anode electrodes 206-1 and 206-3 while the anode lead-out electrode A2 is kept selected. Concurrently, the cathode lead-out electrode C2 is still kept selected. This results in the remaining phosphors G, B, G, B, --- on the second line being permitted to emit light, and luminescence of the phosphors is controlled by color data on green or blue concurrently applied to the gate lead-out electrode GT1 to GTn.

Thus, the anode lead-out electrodes A1 and A2 are selected in turn while the cathode lead-out electrodes C1 to Cn are scanned in turn, so that scanning of the last cathode lead-out electrode Cn results in all the picture cells of the image display device being permitted to emit light and luminescence thereof being controlled. Thus, an image for one frame is displayed on the image display device.

Now, the manner of operation of the drive circuit for the image display device 50 constructed as described above will be described with reference to FIGS. 5 and 18(a) to 18(k), 18(m), 18(n) 18(p) and 18(q)

Image data are fed to the memory write control circuit 53, in which a write timing of the image data is subject to control. Also, the color data are stored for every color in the video memory 54 in synchronism with a clock generated by the clock generator. The memories 54-1 to 54-3 of the video memory 54 have color data on the colors R, G and B stored therein respectively. The color data thus stored in the memories are read therefrom depending on the addresses of the address counter 56 while being subject to control by the color section circuit 57 and then held in the buffer registers 55-1 to 55-3.

The buffer registers 55-1, 55-2 and 55-3 are subject at an output timing thereof to control by the color selection circuit 57, so that color data corresponding to picture cells for every line on which oblique lines are drawn in FIGS. 19(a) to 19(d) are fed from the buffer registers to the shift register circuit 61. The shift register 61 shifts the color data by means of a shift clock SCLK shown in FIG. 18(n).

After color data corresponding in number to the above-described picture cells for one line on which oblique lines are drawn are shifted by the shift register 61, the color data are latched by a latch pulse shown in FIG. 18(m) in the latch circuit 62. Output data of the latch circuit 62 are applied to the gate driver 63.

The display control timing circuit 52 applies, to the anode driver 64, the latch pulse to the latch circuit 63 to control the anode lead-out electrode A1 and anode lead-out electrode A2 in a manner to alternately change over them in synchronism with the latch pulse as shown in FIGS. 18(a) and 18(b), to thereby cause a positive anode voltage Ea to be applied to the anode lead-out electrode selected.

Also, the display control timing circuit 52 feeds the shift register 58 with a latch pulse shown in FIG. 18(q) of a cycle twice as long as the latch pulse shown in FIG. 18(m) as a shift pulse, resulting in a scan signal output from the control circuit 52 being shifted. An output of the shift register 58 is latched by the above-described double latch pulse in the latch circuit 59, so that the latch circuit 59 outputs the scan signal shifted at every latch pulse. The scan signal shifted is then fed to the cathode driver 60.

This results in the cathode driver 60 selecting the cathode lead-out electrodes C1, C2, C3, ---, Cn of the image display device 50 in turn as shown in FIGS. 18(c), 18(d), 18(e) and 18(f), during which changing-over between the anode lead-out electrode A1 and the anode lead-out electrode A2 is carried out for selection.

Concurrently, color data shown in FIG. 18(g), 18(h), 18(i) and 18(j) are fed from the gate driver 63 to the gate lead-out electrodes GT1 to GT1 in synchronism with changing-over between the anode lead-out electrodes, so that color data on the colors R, R, R, ---, R shown in FIG. 19(a) are fed to the gate lead-out electrodes GT1 to GT1 while the anode lead-out electrode A1 is kept driven as shown in FIG. 18(a).

Thus, of the picture cells on the first line of the image display device 50, the picture cells R on which oblique lines are drawn are subject to luminous control as shown in FIG. 19(a). Then, the anode lead-out electrode A2 is selected at a timing of the next latch pulse. At this time, color data on green and blue have been shifted in the shift register 61 by means of the shift clock SCLK, so that the image display device 50 controls luminescence or light emission of the remaining picture cells G and B on the first line shown in FIG. 19(b) on which oblique lines are drawn.

Then, the cathode lead-out electrode C2 is selected at the next timing and changing-over between the anode lead-out electrodes A1 and A2 is carried out, so that light emission of picture cells on a second line are controlled.

Such operation is repeated in turn, so that when scanning of the last cathode lead-out electrode Cn is completed, picture cells on all lines are subject to luminous control, resulting in an image for one frame being displayed on the image display device 50.

Now, another example of the drive circuit for driving the image drive device 50 will be described. The drive circuit may be basically constructed in substantially the same manner as that shown in FIG. 8, although both are somewhat different in timing.

As shown in FIGS. 20(a) to 20(k), 20(m), 20(n) and 20(p), the cathode lead-out electrodes C1 to Cn are scanned in turn while a positive anode voltage Ea is kept applied to the anode lead-out electrode A1. After completion of scanning of the cathode lead-out electrodes, the cathode lead-out electrodes C1 to Cn are scanned in turn while the positive anode voltage is kept applied to the anode lead-out electrode A2, resulting in an image for one frame being obtained.

FIGS. 21(a) to 21(d) show scanning of picture cells.

In FIGS. 21(a) to 21(d), R, G and B designate the picture cells of FIG. 17 arranged in a matrix-like manner on each of the anode electrodes, of which suffixes are deleted for the sake of brevity. FIG. 21(a) shows a state that picture cells selected by applying a positive anode voltage Ea to the anode lead-out electrode A1 and selecting the cathode lead-out electrode C1 are permitted to emit light, wherein the selected picture cells are indicated at oblique lines. More particularly, in FIG. 21(a), phosphors of a red luminous color or phosphors R, R, - - - on a first line which are deposited on the anode electrode 206-2 connected to the anode lead-out electrode A1 and on which oblique lines are drawn are permitted to emit light. The reason why the picture cells or phosphors R arranged at every third intervals are thus permitted to emit light is that the anode electrodes 206-2 are arranged at every third intervals. Light emission or luminescence of the phosphors R thus selected is controlled depending on color data on a red luminous color concurrently applied to the gate lead-out electrodes GT1 to GT1.

FIG. 21(b) shows a state obtained at a timing next to the state shown in FIG. 21(a), wherein the positive anode voltage is kept applied to the anode lead-out electrode A1, however, the cathode lead-out electrode C2 is selected in place of the cathode lead-out electrode C1. Picture cells thus selected are indicated at oblique lines on a second line.

Thus, phosphors R, R, R, - - - on the second line on which oblique lines are drawn are permitted to emit light. Likewise, luminescence or light emission of the phosphors R is controlled by color data on red concurrently applied to the gate lead-out electrodes GT1 to GT1.

Such driving is repeated in turn, so that when scanning of the cathode electrode Cn is completed, a state shown in FIG. 21(c) is obtained. In the state of FIG. 21(c), the positive anode voltage Ea is applied to the anode lead-out electrode A2 and the cathode lead-out cathode C1 is selected, resulting in picture cells on the first line on which oblique lines are drawn being selected. More particularly, phosphors G, B, G, B, - - - on the first line which are deposited on the anode electrodes 206-1 and 206-3 connected to the anode lead-out electrode A2 are permitted to emit light and light emission of the phosphors is controlled by color data on green or blue concurrently applied to the gate lead-out electrodes GT1 to GT1. This results on all picture cells on the first line being subject to luminous control.

Then, A state shown in FIG. 21(d) is obtained, wherein the positive anode voltage Ea is still kept applied to the anode lead-out electrode A2, however, the cathode lead-out electrode C2 is selected in place of the cathode lead-out electrode C1, resulting in picture cells on the second line on which oblique lines are drawn being selected. More particularly, the phosphors G, B, G, B, - - - on the second line are permitted to emit light and light emission of the phosphors is controlled by color data on green or blue concurrently applied to the gate lead-out electrodes GT1 to GT1.

Thus, the cathode lead-out electrodes C1 to Cn are scanned in turn while the positive anode voltage is kept applied to the anode lead-out electrode A2, so that scanning of the last cathode lead-out electrode Cn is completed, all picture cells of the display device are permitted to emit light while the luminescence is kept controlled, so that an image for one frame is displayed.

FIG. 20(a) shows an output pulse of an anode driver for driving the anode lead-out electrode A1, FIG. 20(b) shows an output pulse of the anode driver 64 for driving the anode lead-out electrode A2, FIG. 20(c) shows an output pulse of the cathode driver 60 for driving the cathode lead-out electrode C1, FIG. 20(d) shows an output pulse of the cathode driver 60 for driving the cathode lead-out electrode C2, FIG. 20(e) shows an output pulse of the cathode driver 60 for driving the cathode lead-out electrode C3, and FIG. 20(f) shows an output pulse of the cathode driver 60 for driving the cathode lead-out electrode Cn.

FIG. 20(g) shows color data applied from the gate driver 63 to the gate lead-out electrode GT1, FIG. 20(h) shows color data applied from the gate driver 63 to the gate lead-out electrode GT2, FIG. 20(i) shows color data applied from the gate driver 63 to the gate lead-out electrode GT3, FIG. 20(j) shows color data applied from the gate driver 63 to the gate lead-out electrode GT1, FIG. 20(k) shows an enable signal for controlling operation of the cathode driver 60, FIG. 20(m) shows a latch pulse indicating a latch timing of each of the latch circuits 59 and 62, FIG. 20(n) shows a shift clock fed to the shift register 61, and FIG. 20(p) shows color data fed from the gate driver 63 to the gate lead-out electrodes GT1 to GTn of the gate electrode 3.

Now, the manner of operation of the drive circuit constructed as described above will be described with reference to FIGS. 20(a) to 20(k), 20(m), 20(n) and 20(p).

Image data are fed to the memory write control circuit 53, in which a write timing of the image data is subject to control. Also, the color data are stored for every color in synchronism with a clock generated by the clock generator in the video memory 54. The memories 54-1 to 54-3 of the video memory 54 have color data on the colors R, G and B stored therein respectively. The color data thus stored in the memories are read therefrom depending on the addresses of the address counter 556 while being subject to the color section circuit 57 and then held in the buffer registers 55-1 to 55-3.

The buffer registers 55-1, 55-2 and 55-3 are subject at an output timing thereof to control by the color selection circuit 57, so that the color data held therein are fed in the same order as the picture cells on which oblique lines are drawn in FIGS. 19(a) to 19(d) to the shift register circuit 61. The shift register 61 shifts the color data by means of the shift clock SCLK shown in FIG. 20(n).

Of the picture cells on the first line of the image display device 50, color data on red corresponding in number to the anode electrodes 206-2 connected to the anode lead-out electrode A1 are fed to the shift register 61, which then shifts the color data. Then, the color data are latched by the latch pulse shown in FIG. 20(m) in the latch circuit 62. Output data of the latch circuit 62 are applied to the gate driver 63.

The display control timing circuit 52 controls the anode driver 64, to thereby cause the anode driver 64 to a positive anode voltage to only the anode lead-lead electrode A1 as shown in FIGS. 20(a) and 20(b). Also, the display control timing circuit 52 feed the shift register 58 with the latch pulse shown in FIG. 20(m) as a shift pulse, resulting in a scan signal output from the control circuit 52 being shifted. An output of the shift register 58 is latched by the above-described latch pulse in the latch circuit 59, so that the latch circuit 59 outputs the scan signal shifted at every latch pulse. The scan signal shifted is then fed to the cathode driver 60.

This results in output pulses being fed from the cathode driver 60 to the cathode lead-out electrodes C1, C2, C3, - - -, Cn of the image display device 50 in turn as shown in FIGS. 20(c), 20(d), 20(e) and 20(f), so that the cathode lead-out electrodes C1, C2, C3, - - -, Cn each are scanned at a timing of the latch pulse described above.

At this time, color data shown in FIG. 20(g), 20(h), 20(i) and 20(j) are fed from the gate driver 63 to the gate lead-out electrodes GT1 to GT1 in synchronism with scanning of the cathode lead-out electrodes C1 to Cn, so that color data on the colors R, R, - - -, R shown in FIG. 21(a) are fed to the gate lead-out electrodes GT1 to GT1 while the cathode lead-out electrode C1 is kept driven as shown in FIG. 20(c).

Thus, the phosphors R on the first line of the image display device 50 is subject to luminous control as shown in FIG. 21(a). Then, the cathode lead-out electrode C2 is selected at a timing of the next latch pulse. At this time, the next color data on red have been shifted into the shift register 61 by means of the shift clock SCLK, so that the image display device 50 controls luminescence or light emission of the picture cells R on the second line as shown in FIG. 21(b).

Such scanning as described above is successively carried out, so that scanning of the last cathode lead-out electrode Cn leads to control of luminescence of the picture cells R for one frame. Then, the display timing control circuit 52 controls the anode driver 64, resulting in the anode driver 64 applying a positive anode voltage Ea to the anode lead-out electrode A2.

Concurrently, color data shown in FIG. 20(g), 20(h), 20(i) and 20(j) are fed from the gate driver 63 to the gate lead-out electrodes GT1 to GT1 in synchronism with scanning of the cathode lead-out electrodes, so that color data on the colors G, B, G, - - - B shown in FIG. 21(c) on which oblique lines are drawn are fed to the gate lead-out electrodes GT1 to GT1 while the cathode lead-out electrode C1 is kept driven as shown in FIG. 20(c).

Thus, the picture cells G and R on the first line of the image display device 50 on which oblique lines are drawn are subject to luminous control as shown in FIG. 21(c). Then, the cathode lead-out electrode C2 is selected at a timing of the next latch pulse. At this time, color data on green and blue have been shifted, in the shift register 61 by means of the shift clock SCLK, so that the image display device 50 controls luminescence or light emission of picture cells G and B on the second line shown in FIG. 21(d) on which oblique lines are drawn.

Such scanning as described above is successively carried out, so that scanning of the last cathode lead-out electrode Cn leads to control of luminescence of the picture cells G and B for one frame. Thus, a color image for one frame is displayed on the image display device 50.

The drive circuit for the image display device reduces the number of times of changing-over of the anode electrodes to which a high voltage is applied, to thereby lighten a burden on the drive circuit for the anode lead-out electrodes, resulting in the drive circuit being simply constructed. Also, the anode lead-out electrode unselected is biased to a negative voltage, mixing of colors being prevented.

The embodiments described above each have the phosphors of red, blue and green luminous colors incorporated therein. Alternatively, the present invention may be constructed in such a manner that one kind of a phosphor having an increased luminous wavelength range and filters different in transmission wavelength characteristics are arranged, to thereby obtain a plurality of luminous colors such as red, blue, green and the like through the phosphor. In this case, luminous characteristics of the phosphor itself are different from those of each of luminous colors obtained through the filters, so that a phosphor of a luminous color having the lowest luminarice may be conveniently used as the single phosphor.

As can be seen from the foregoing, the image display device of the present invention has only two anode lead-out electrodes incorporated therein, to thereby permit each of the anode lead-out electrodes to be led out of each of both sides of the device, resulting in eliminating multi-level crossing. Also, such construction of the present invention leads to dividing of the anode electrodes into two groups, to thereby permit the duty to be increased to a level 3/2 times as large as that in the prior art in which anode electrodes are divided into three groups, resulting in providing an image of increased brightness.

Also, in the present invention, the anode electrodes divided into two groups are selectively scanned, to thereby permit the picture cells to selectively emit light, resulting in providing a color image free of color bleeding.

Further, the control electrodes arranged between the gate electrodes effectively prevents spreading of electrons, so that the number of anode electrodes may be substantially increased to provide an image with high definition. Thus, the device of the present invention, when it is applied to a microwave vacuum tube, a light source, an amplification element, a high-speed switching element, a sensor or the like, provides an anode or collector with a sufficient amount of electrons, to thereby significantly increase sensitivity and stability of an image obtained.

In addition, the present invention effectively prevents color mixing and leakage luminescence irrespective of a distance between the phosphor layer and the gate electrode, to thereby permit an anode voltage to be increased to a level sufficient to increase luminance.

Furthermore, the present invention prevents color mixing without requiring selection by means of the anode electrodes, to thereby eliminate switching at a high voltage.

Also, the present invention permits positive ions due to gas such as residual gas to be absorbed by the diffusion prevention electrodes by applying a negative potential to the electrodes, to thereby prevent deterioration of the emitter electrodes due to adhesion of the ions thereto.

Furthermore, The present invention is so constructed that the diffusion prevention electrodes are arranged on the same plane as the gate electrodes. Such construction permits the structure of the present invention to be highly simplified as compared with the prior art in which diffusion prevention electrodes are arranged between cathodes and anodes, leading to a multi-layer structure. Thus, the present invention accomplishes a decrease in manufacturing cost.

Also, the present invention may be so constructed that the anode electrode provided thereon with the phosphor which is expected to be decreased in luminance is fed with electrons from two FECs. Such construction permits the phosphor to be increased in luminance.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A drive device for an image display device comprising:
   a first substrate;
   a plurality of stripe-like cathode electrodes formed on said first substrate and including emitters for field-emitting electrons;
   cathode lead-out electrodes led out of said stripe-like cathode electrodes, respectively;
   a plurality of stripe-like gate electrodes arranged on said stripe-like cathode electrodes, in a manner to be perpendicular to said stripe-like cathode electrodes while being kept insulated from said stripe-like cathode electrodes;
   gate lead-out electrodes led out of said stripe-like gate electrodes;
   a second substrate arranged in a manner to be spaced by a predetermined distance from said first substrate;
   a plurality of first stripe-like anode electrodes formed on said second substrate in a manner to be opposite to said stripe-like gate electrodes and perpendicular to said stripe-like cathode electrodes;
   a plurality of second stripe-like anode electrodes formed on said second substrate in a manner to be opposite to said stripe-like gate electrodes and perpendicular to said stripe-like cathode electrodes, said first stripe-like anode electrodes being interleaved with said second stripe-like anode electrodes;
   a first anode lead-out electrode connected to said first stripe-like anode electrodes and led out of said first stripe-like anode electrodes;
   a second anode lead-out electrode connected to said second stripe-like anode electrodes and led out of said second stripe-like anode electrodes;
   phosphors arranged on said first and second stripe-like anode electrodes, to thereby provide red, blue and green luminous colors in turn; and
   a scanning means for scanning said cathode lead-out electrodes in turn while one of said first and second anode lead-out electrodes is kept selected and then scanning said cathode lead-out electrodes in turn while the other of said first and second anode lead-out electrodes is kept selected;
   said scanning means permitting said image display device to display an image.

2. A drive device as defined in claim 1, wherein said red, blue and green luminous colors are obtained through a filter means.

3. A drive device as defined in claim 1 or 2, wherein color data corresponding to scanning of said cathode lead-out electrodes are fed to said gate lead-out electrodes in synchronism with said scanning of said cathode lead-out electrodes.

4. A drive device for an image display device comprising:
   a first substrate;
   a plurality of stripe-like cathode electrodes formed on said first substrate and including emitters for field-emitting electrons;
   cathode lead-out electrodes led out of said stripe-like cathode electrodes, respectively;
   a plurality of stripe-like gate electrodes arranged on said stripe-like cathode electrodes, in a manner to be perpendicular to said stripe-like cathode electrodes while being kept insulated from said stripe-like cathode electrodes;
   gate lead-out electrodes led out of said stripe-like gate electrodes;
   a second substrate arranged in a manner to be spaced by a predetermined distance from said first substrate;
   a plurality of first stripe-like anode electrodes formed on said second substrate in a manner to be opposite to said stripe-like gate electrodes and perpendicular to said stripe-like cathode electrodes;
   a plurality of second stripe-like anode electrodes formed on said second substrate in a manner to be opposite to said stripe-like gate electrodes and perpendicular to said stripe-like cathode electrodes, said first stripe-like anode electrodes being interleaved with said second stripe-like anode electrodes;
   a first anode lead-out electrode connected to said first stripe-like anode electrodes and led out of said first stripe-like anode electrodes;
   a second anode lead-out electrode connected to said second stripe-like anode electrodes and led out of said second stripe-like anode electrodes;
   phosphors arranged on said first and second stripe-like anode electrodes, to thereby provide red, blue and green luminous colors in turn;
   a first scanning means for scanning said cathode lead-out electrodes in turn; and
   a second scanning means for scanning said first and second anode lead-out electrodes while one of said cathode lead-out electrodes is kept selectively scanned;
   said first and second scanning means permitting said image display device to display an image.

5. A drive device as defined in claim 4, wherein said red, blue and green luminous colors are obtained through a filter means.

6. A drive device as defined in claim 4 or 5, wherein color data corresponding to scanning of said cathode lead-out electrodes are fed to said gate lead-out electrodes in synchronism with said scanning of said cathode lead-out electrodes.

7. An image display drive device for an image display device comprising:
   a first substrate;
   a plurality of stripe-like cathode electrodes formed on said first substrate and including emitters for field-emitting electrons;

cathode lead-out electrodes led out of said stripe-like cathode electrodes, respectively;

a plurality of stripe-like gate electrodes arranged on said stripe-like cathode electrodes in a manner to be perpendicular to said stripe-like cathode electrodes while being kept insulated from said stripe-like cathode electrodes;

gate lead-out electrodes led out of said stripe-like gate electrodes, respectively;

a second substrate arranged in a manner to be spaced by a predetermined distance from said first substrate;

a plurality of first stripe-like anode electrodes formed on said second substrate in a manner to be opposite to said stripe-like gate electrodes and perpendicular to said stripe-like cathode electrodes;

a plurality of second stripe-like anode electrodes formed on said second substrate in a manner to be opposite to said stripe-like gate electrodes and perpendicular to said stripe-like cathode electrodes, said first stripe-like anode electrodes being interleaved with said second stripe-like anode electrodes;

said first and second stripe-like anode electrodes being provided thereon with phosphors of red, blue and green luminous colors in turn;

a first anode lead-out electrode to which the first stripe-like anode electrode having the phosphor of one color of the worst luminous efficiency provided thereon is connected; and a second anode lead-out electrode to which the second stripe-like anode electrodes having the remaining phosphors of two other colors formed thereon are connected;

said stripe-like gate electrodes being so arranged that two said stripe-like gate electrodes are positioned below said first stripe-like anode electrodes and one said stripe-like gate electrode is positioned below said second stripe-like anode electrodes;

wherein said cathode lead-out electrodes are fully scanned in turn while one of said first and second anode lead-out electrodes is kept selected and then said cathode lead-out electrodes are fully scanned while the other of said first and second anode lead-out electrodes is kept selected, resulting in an image for one frame being displayed on said image display device.

8. An image display drive device as defined in claim 7 wherein said one color is red.

9. An image display drive device for an image display device comprising:

a first substrate;

a plurality of stripe-like cathode electrodes formed on said first substrate and including emitters for field-emitting electrons;

cathode lead-out electrodes led out of said stripe-like cathode electrodes, respectively;

a plurality of stripe-like gate electrodes arranged on said stripe-like cathode electrodes in a manner to be perpendicular to said stripe-like cathode electrodes while being kept insulated from said stripe-like cathode electrodes;

gate lead-out electrodes led out of said stripe-like gate electrodes, respectively;

a second substrate arranged in a manner to be spaced by a predetermined distance from said first substrate;

a plurality of first stripe-like anode electrodes formed on said second substrate in a manner to be opposite to said stripe-like gate electrodes and perpendicular to said stripe-like cathode electrodes;

a plurality of second stripe-like anode electrodes formed on said second substrate in a manner to be opposite to said stripe-like gate electrodes and perpendicular to said stripe-like cathode electrodes, said first stripe-like anode electrodes being interleaved with said second stripe-like anode electrodes;

said first and second stripe-like anode electrodes being provided thereon with phosphors, respectively;

a filter means arranged for permitting lights emitted from said phosphors to pass therethrough, to thereby provide red, blue and green luminous colors from said stripe-like anode electrodes in turn;

a first anode lead-out electrode to which the first stripe-like anode electrode having the phosphor one color of the worst luminous efficiency provided thereon is connected; and a second anode lead-out electrode to which the second stripe-like anode electrodes having the remaining phosphors of two other colors formed thereon are connected;

said stripe-like gate electrodes being so arranged that two said stripe-like gate electrodes are positioned below said first stripe-like anode electrodes and one said stripe-like gate electrode is positioned below said second stripe-like anode electrodes;

wherein said cathode lead-out electrodes are fully scanned in turn while one of said first and second anode lead-out electrodes is kept selected and then said cathode lead-out electrodes are fully scanned while the other of said first and second anode lead-out electrodes is kept selected, resulting in an image for one frame being displayed on said image display device.

10. An image display drive device as defined in claim 9 wherein said one color is red.

11. An image display drive device as defined in claim 7 or 9, wherein color data corresponding to said scanning of said cathode lead-out electrodes are fed to said gate lead-out electrodes in synchronism with said scanning of said cathode lead-out electrodes, respectively.

12. An image display drive device for an image display device comprising:

a first substrate;

a plurality of stripe-like cathode electrodes formed on said first substrate and including emitters for field-emitting electrons;

cathode lead-out electrodes led out of said stripe-like cathode electrodes, respectively;

a plurality of stripe-like gate electrodes arranged on said stripe-like cathode electrodes in a manner to be perpendicular to said stripe-like cathode electrodes while being kept insulated from said stripe-like cathode electrodes;

gate lead-out electrodes led out of said stripe-like gate electrodes, respectively;

a second substrate arranged in a manner to be spaced by a predetermined distance from said first substrate;

a plurality of first stripe-like anode electrodes formed on said second substrate in a manner to be opposite to said stripe-like gate electrodes and perpendicular to said stripe-like cathode electrodes;

a plurality of second stripe-like anode electrodes formed on said second substrate in a manner to be opposite to said stripe-like cathode electrodes, said first stripe-like anode electrodes being interleaved with said second stripe-like anode electrodes;

said first and second stripe-like anode electrodes being provided thereon with phosphors of red, blue and green luminous colors in turn;

a first anode lead-out electrode to which the first stripe-like anode electrode having the phosphor of one color of the worst luminous efficiency provided thereon is connected; and a second anode lead-out electrode to which the second stripe-like anode electrodes having the remaining phosphors of two other colors formed thereon are connected;

said stripe-like gate electrodes being so arranged that two said stripe-like gate electrodes are positioned below said first stripe-like anode electrodes and one said stripe-like gate electrode is positioned below said second stripe-like anode electrodes;

wherein said cathode lead-out electrodes are scanned in turn; and said first and second lead-out anode electrodes are scanned while one of said cathode lead-out electrodes is kept selectively scanned, so that said cathode lead-out electrodes are fully scanned to cause an image for one frame to be displayed on said image display device.

13. An image display drive device as defined in claim 12 wherein said one color is red.

14. An image display drive device for an image display device comprising:

a first substrate;

a plurality of stripe-like cathode electrodes formed on said first substrate and including emitters for field-emitting electrons;

cathode lead-out electrodes led out of said stripe-like cathode electrodes, respectively;

a plurality of stripe-like gate electrodes arranged on said stripe-like cathode electrodes in a manner to be perpendicular to said stripe-like cathode electrodes while being kept insulated from said stripe-like cathode electrodes;

gate lead-out electrodes led out of said stripe-like gate electrodes, respectively;

a second substrate arranged in a manner to be spaced by a predetermined distance from said first substrate;

a plurality of first stripe-like anode electrodes formed on said second substrate in a manner to be opposite to said stripe-like gate electrodes and perpendicular to said stripe-like cathode electrodes;

a plurality of second stripe-like anode electrodes formed on said second substrate in a manner to be opposite to said stripe-like gate electrodes and perpendicular to said stripe-like cathode electrodes, said first stripe-like anode electrodes being interleaved with said second stripe-like anode electrodes;

said first and second stripe-like anode electrodes being provided thereon with phosphors, respectively;

a filter means arranged for permitting lights emitted from said phosphors to pass therethrough, to thereby obtain red, blue and green luminous colors from said stripe-like anode electrodes in turn;

a first anode lead-out electrode to which the first stripe-like anode electrode having the phosphor of one color of the worst luminous efficiency provided thereon is connected; and a second anode lead-out electrode to which the second stripe-like anode electrodes having the remaining phosphors of two other colors formed thereon are connected;

said stripe-like gate electrodes being so arranged that two said stripe-like gate electrodes are positioned below said first anode electrodes and one said stripe-like gate electrode is positioned below said second stripe-like anode electrodes;

wherein said cathode lead-out electrodes are scanned in turn; and said first and second lead-out anode electrodes are scanned while one of said cathode lead-out electrodes is kept selectively scanned, so that said cathode lead-out electrodes are fully scanned to cause an image for one frame to be displayed on said image display device.

15. An image display drive device as defined in claim 14 wherein said one color is red.

16. An image display drive device as defined in claim 12 or 14, wherein color data are fed to said gate lead-out electrodes in synchronism with said scanning of said first and second lead-out electrodes, respectively.

* * * * *